United States Patent
Park et al.

(10) Patent No.: US 9,414,373 B2
(45) Date of Patent: Aug. 9, 2016

(54) METHOD OF TRANSMITTING/RECEIVING DOWNLINK CONTROL INFORMATION AND USER EQUIPMENT THEREFOR IN WIRELESS ACCESS SYSTEM

(75) Inventors: Kyujin Park, Anyang-si (KR); Jaehoon Chung, Anyang-si (KR); Jiwoong Jang, Anyang-si (KR); Hangyu Cho, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/234,222

(22) PCT Filed: Jul. 26, 2012

(86) PCT No.: PCT/KR2012/005963
§ 371 (c)(1),
(2), (4) Date: Jan. 22, 2014

(87) PCT Pub. No.: WO2013/015627
PCT Pub. Date: Jan. 31, 2013

(65) Prior Publication Data
US 2014/0146799 A1    May 29, 2014

Related U.S. Application Data

(60) Provisional application No. 61/512,421, filed on Jul. 28, 2011.

(51) Int. Cl.
*H04W 72/04* (2009.01)
*H04L 5/00* (2006.01)
*H04L 27/26* (2006.01)
*H04L 1/18* (2006.01)

(52) U.S. Cl.
CPC ........... *H04W 72/042* (2013.01); *H04L 5/0053* (2013.01); *H04L 1/1861* (2013.01); *H04L 27/2636* (2013.01)

(58) Field of Classification Search
CPC . H04L 5/0053; H04L 1/1861; H04L 27/2636; H04W 72/02; H04W 72/04; H04W 72/042; H04W 72/12
See application file for complete search history.

(56) References Cited

U.S. PATENT DOCUMENTS

2005/0120097 A1    6/2005    Walton et al.
2011/0170496 A1    7/2011    Fong et al.
(Continued)

FOREIGN PATENT DOCUMENTS

CN    1906892    1/2007
CN    101826907    9/2010
(Continued)

OTHER PUBLICATIONS

3rd Generation Partnership Project (3GPP), "Technical Specification Group Radio Access Network; Evolved Universal Terrestrial Radio Access (E-UTRA); Physical Layer Procedures (Release 10)," 3GPP TS 36.213 V10.2.0, Jun. 2011, 120 pages.
(Continued)

*Primary Examiner* — Candal Elpenord
(74) *Attorney, Agent, or Firm* — Lee, Hong, Degerman, Kang & Walmey; Jonathan Kang; Michael Monaco

(57) ABSTRACT

A method of receiving downlink control information and a corresponding apparatus in a wireless access system supporting an enhanced physical downlink control channel. The method includes receiving, from an eNB, DCI transmission channel information that indicates which one of a physical downlink control channel (PDCCH) and the e-PDCCH is used to transmit the DCI, checking the starting symbol of the e-PDCCH when the DCI transmission channel information indicates that the e-PDCCH is used to transmit the DCI, and receiving the DCI by performing blind decoding on the e-PDCCH from the starting symbol of the e-PDCCH.

12 Claims, 24 Drawing Sheets

(56) References Cited

U.S. PATENT DOCUMENTS

| | | | |
|---|---|---|---|
| 2012/0275400 A1* | 11/2012 | Chen | H04J 11/0033 370/329 |
| 2013/0039284 A1* | 2/2013 | Marinier | H04L 5/001 370/329 |
| 2013/0183987 A1* | 7/2013 | Vrzic | H04L 1/0046 455/450 |
| 2013/0250864 A1* | 9/2013 | Zhang | H04W 72/042 370/329 |

FOREIGN PATENT DOCUMENTS

| | | |
|---|---|---|
| EP | 2302830 | 3/2011 |
| WO | 2011/074868 | 6/2011 |

OTHER PUBLICATIONS

ZTE, "Aspects on DL control signaling enhancements," TSG-RAN WG1 #65, R1-111521, May 2011, 4 pages.

Research in Motion, UK Limited, "PDCCH Enhancement Considerations," 3GPP TSG RAN WG1 Meeting #65, R1-111661, May 2011, 4 pages.

Panasonic, "Considerations on PDCCH Enhancements for Release 11," 3GPP TSG RAN WG1 Meeting #65, R1-111589, May 2011, 2 pages.

MediaTek Inc., "Discussion on PDCCH Enhancement for DL MU-MIMO and CoMP," 3GPP TSG-RAN WG1 #65, R1-111531, May 2011, 3 pages.

PCT International Application No. PCT/KR2012/005963, Notification of Transmittal of the International Search Report and the Written Opinion of the International Searching Authority, or Declaration dated Feb. 19, 2013, 9 pages.

Samsung, "PDCCH Extension to Support Operation with Cross-Carrier Scheduling," 3GPP TSG RAN WG1 #60, R1-101142, Feb. 2010, 2 pages.

European Patent Office Application Serial No. 12817449.7, Search Report dated Feb. 5, 2015, 8 pages.

The State Intellectual Property Office of the People's Republic of China Application No. 201280037455.X, Office Action dated May 5, 2016, 16 pages.

* cited by examiner

FIG. 16
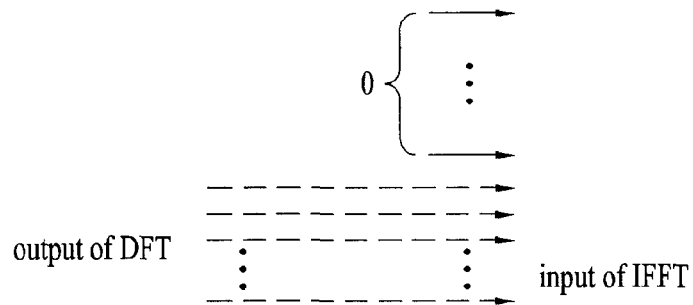
(a)
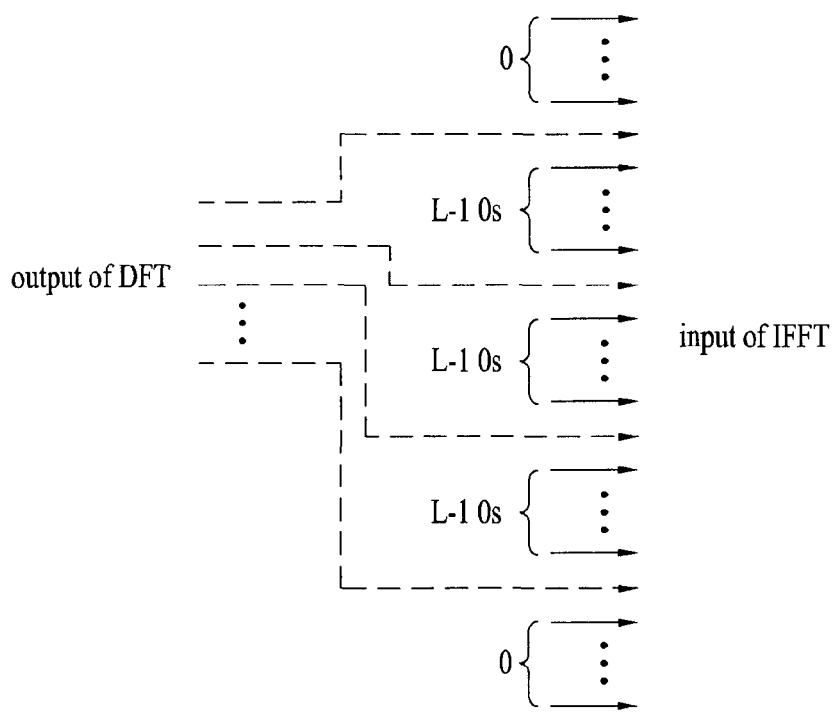
(b)

METHOD OF TRANSMITTING/RECEIVING DOWNLINK CONTROL INFORMATION AND USER EQUIPMENT THEREFOR IN WIRELESS ACCESS SYSTEM

CROSS-REFERENCE TO RELATED APPLICATIONS

This application is the National Stage filing under 35 U.S.C. 371 of International Application No. PCT/KR2012/005963, filed on Jul. 26, 2012, which claims the benefit of U.S. Provisional Application Ser. No. 61/512,421, filed on Jul. 28, 2011, the contents of which are hereby incorporated by reference herein in their entirety.

TECHNICAL FIELD

The present invention relates to a wireless access system, and more particularly, to a method of transmitting/receiving downlink control information and an apparatus for supporting the same in a wireless access system supporting an enhanced physical downlink control channel.

BACKGROUND ART

A mobile communication system was developed in order to provide voice service while securing user mobility. However, the mobile communication system gradually extends service coverage to data service from the voice service and currently reaches a high-speed data service. Currently used mobile communication systems have problems of lack of resources and cannot satisfy user demands for ultra-high-speed service, and thus enhanced mobile communication systems are needed.

The most important one of requirements of a next-generation wireless access system is to support a high data transfer rate. To achieve this, various technologies such as multiple input multiple output (MIMO), cooperative multi-point transmission (CoMP), relay, etc. are developed and studied.

To maximize performances of these technologies, a downlink control channel used in existing systems cannot be employed. Accordingly, 3GPP LTE-A systems introduce an enhanced physical downlink control channel (e-PDCCH) in order to increase the capacity of a PDCCH used in 3GPP LTE systems.

In a wireless access system supporting the e-PDCCH, a base station (BS) needs to set which one of the PDCCH and e-PDCCH is used to transmit downlink control information. Furthermore, an user equipment (UE) needs to set an e-PDCCH region in order to correctly receive the downlink control information.

DISCLOSURE

Technical Problem

An object of the present invention is to provide a method of transmitting/receiving downlink control information between a UE and a BS and an apparatus for the same in a wireless access system, preferably, in a wireless access system supporting an e-PDCCH.

Another object of the present invention is to provide a method of configuring a channel transmitting downlink control information and an apparatus for the same in a wireless access system supporting an e-PDCCH.

Another object of the present invention is to provide a method of configuring an e-PDCCH region and an apparatus for the same in a wireless access system supporting an e-PDCCH.

The technical problems solved by the present invention are not limited to the above technical problems and those skilled in the art may understand other technical problems from the following description.

Technical Solution

In accordance with one aspect of the present invention, a method of receiving downlink control information (DCI) in a wireless access system supporting an enhanced physical downlink control channel (e-PDCCH) multiplexed with a physical downlink shared channel (PDSCH), includes receiving, from an eNB, DCI transmission channel information that indicates which one of a physical downlink control channel (PDCCH) and the e-PDCCH is used to transmit the DCI, checking the starting symbol of the e-PDCCH when the DCI transmission channel information indicates that the e-PDCCH is used to transmit the DCI, and receiving the DCI by performing blind decoding on the e-PDCCH from the starting symbol of the e-PDCCH.

In accordance with another aspect of the present invention, a user equipment (UE) for receiving DCI in a wireless access system supporting an e-PDCCH multiplexed with a PDSCH includes a radio frequency (RF) unit configured to transmit/receive RF signals, and a processor configured to receive, from an eNB, DCI transmission channel information that indicates which one of a PDCCH and the e-PDCCH is used to transmit the DCI, to check the starting symbol of the e-PDCCH when the DCI transmission channel information indicates that the e-PDCCH is used to transmit the DCI, to receive the DCI by performing blind decoding on the e-PDCCH from the starting symbol of the e-PDCCH.

The starting symbol of the e-PDCCH may have an index following an index corresponding to a control format indicator value of a PCFICH transmitted in a subframe in which the e-PDCCH is transmitted.

The starting symbol of the e-PDCCH may have an index following an index corresponding to the PDCCH when the PDCCH has a maximum size in a time domain.

The starting symbol of the e-PDCCH may have an index following an index corresponding to a PHICH duration.

Information about the starting symbol of the e-PDCCH may be received through predetermined control channel elements (CCEs) of the PDCCH.

The DCI transmission channel information may be received using one of UE-specific higher layer signaling, cell-specific higher layer signaling and subframe-specific higher layer signaling.

A bitmap composed of 10 bits each of which corresponds to each subframe may be received as the DCI transmission channel information when subframe-specific higher layer signaling is used.

The DCI transmission channel information may be received when a network entry procedure is performed for the eNB.

The DCI transmission channel information may be received through predetermined CCEs of the PDCCH.

Advantageous Effects

According to embodiments of the present invention, downlink control information can be efficiently transmitted and received between a UE and a BS in a wireless access system, preferably, in a wireless access system supporting an e-PD-CCH.

According to embodiments of the present invention, a channel that transmits downlink control information can be correctly configured in a wireless access system supporting an e-PDCCH.

According to embodiments of the present invention, an e-PDCCH region can be correctly configured in a wireless access system supporting an e-PDCCH.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 illustrates signal mapping schemes in a frequency domain to satisfy single carrier properties in the frequency domain;

BEST MODE

Figure 1:
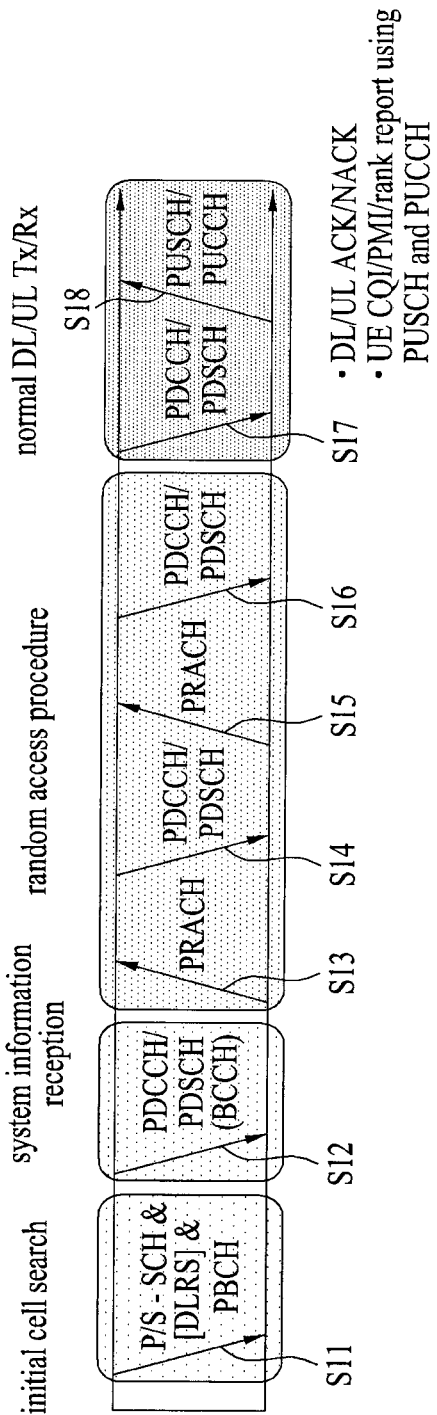
FIG. 1 illustrates physical channels used in a 3GPP LTE system and a signal transmission method using the same.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a description is made centering on a data transmission and reception relationship between a BS and a UE. Here, the BS may be a terminal node of a network, which directly communicates with the terminal. In some cases, a specific operation described as performed by the BS may be performed by an upper node of the BS. Namely, it is apparent that, in a network comprised of a plurality of network nodes including a BS, various operations performed for communication with a terminal may be performed by the BS, or network nodes other than the BS. The term 'BS' may be replaced with the term 'fixed station', 'Node B', 'enhanced Node B (eNode B or eNB)', 'access point', etc. The term 'relay' may be replaced with the term 'relay node (RN)', 'relay station (RS)', etc. The term 'terminal' may be replaced with the term 'user equipment (UE)', 'Mobile Station (MS)', 'Mobile Subscriber Station (MSS)', 'subscriber station (SS)', etc.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc.

UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

1. 3GPP LTE/LTE-A System to which the Present Invention is Applicable 1.1. Outline of System FIG. 1 illustrates physical channels used in a 3GPP LTE system and a signal transmission method using the same.

When powered on or when a UE initially enters a cell, the UE performs initial cell search involving synchronization with an eNB in step S101. For initial cell search, the UE may be synchronized with the eNB and acquire information such as a cell identifier (ID) by receiving a primary synchronization Channel (P-SCH) and a secondary synchronization channel (S-SCH) from the eNB.

Then the UE may receive broadcast information from the cell on a physical broadcast channel (PBCH). In the mean time, the UE may determine a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

The UE may perform a random access procedure to access the eNB in steps S13 to S16. For random access, the UE may transmit a preamble to the eNB on a physical random access channel (PRACH) (S13) and receive a response message for the preamble on a PDCCH and a PDSCH corresponding to the PDCCH (S14). In the case of contention-based random access, the UE may perform a contention resolution procedure by further transmitting the PRACH (S15) and receiving a PDCCH and a PDSCH corresponding to the PDCCH (S16).

After the foregoing procedure, the UE may receive a PDCCH/PDSCH (S17) and transmit a physical uplink shared channel (PUSCH)/physical uplink control channel (PUCCH) (S18), as a general downlink/uplink signal transmission procedure.

Control information transmitted from the UE to the eNB is called uplink control information (UCI). The UCI may include a hybrid automatic repeat and request acknowledgement/negative-ACK (HARQ ACK/NACK) signal, scheduling request (SR), a channel quality indicator (CQI), a precoding matrix index (PMI), a rank indicator (RI), etc.

While the UCI is transmitted through a PUCCH in general in an LTE system, it may be transmitted through a PUSCH when control information and traffic data need to be simultaneously transmitted. The UCI may be aperiodically transmitted through a PUSCH at the request/instruction of a network.

Figure 2:
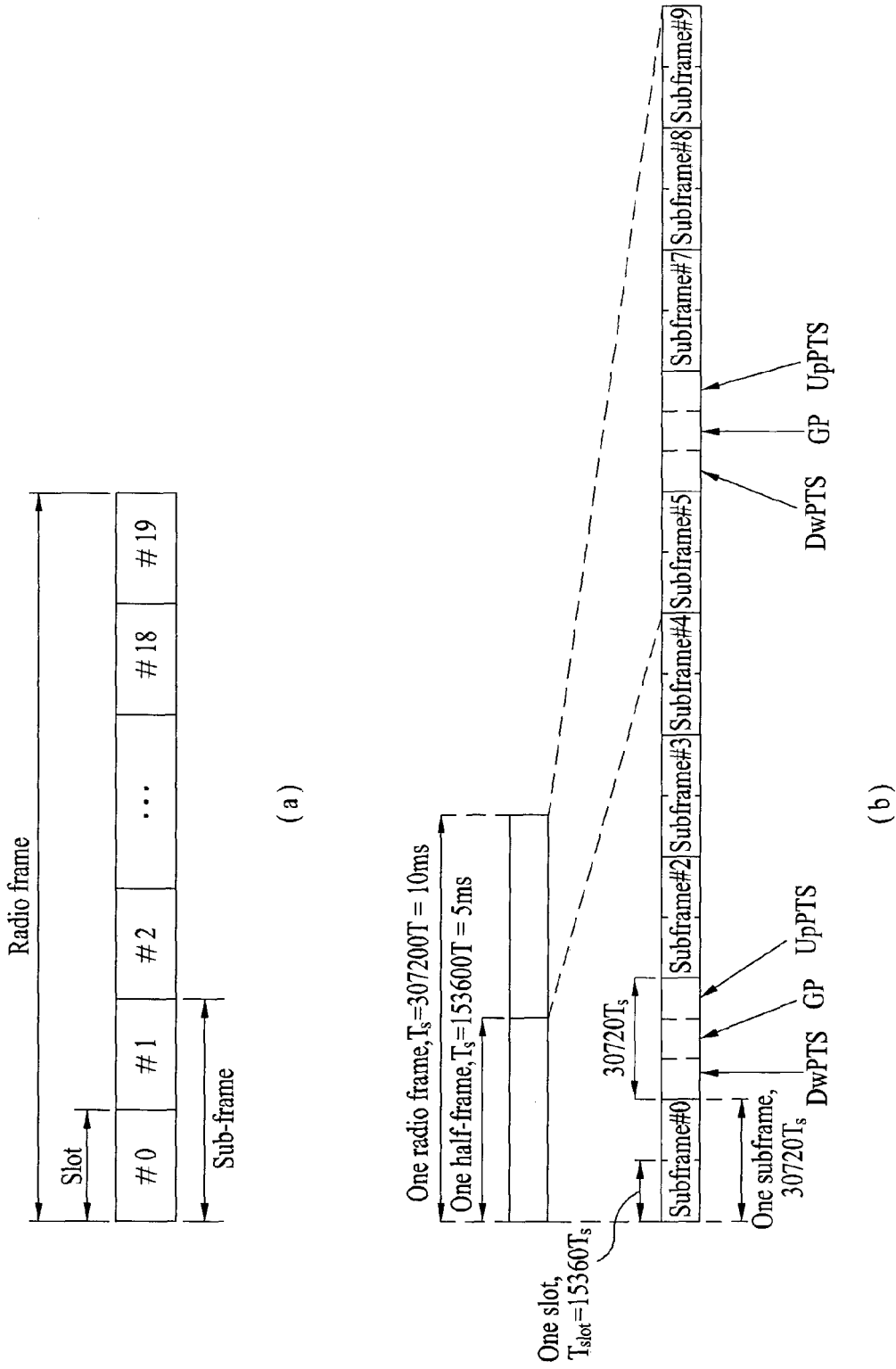
FIG. 2 illustrates a radio frame structure in 3GPP LTE.

FIG. 2 illustrates a radio frame structure in 3GPP LTE. In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal. CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce intersymbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 2(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal.

The aforementioned radio frame structure is purely exemplary and thus the number of subframes included in a radio frame, the number of slots included in a subframe, or the number of symbols included in a slot may vary.

Figure 3:
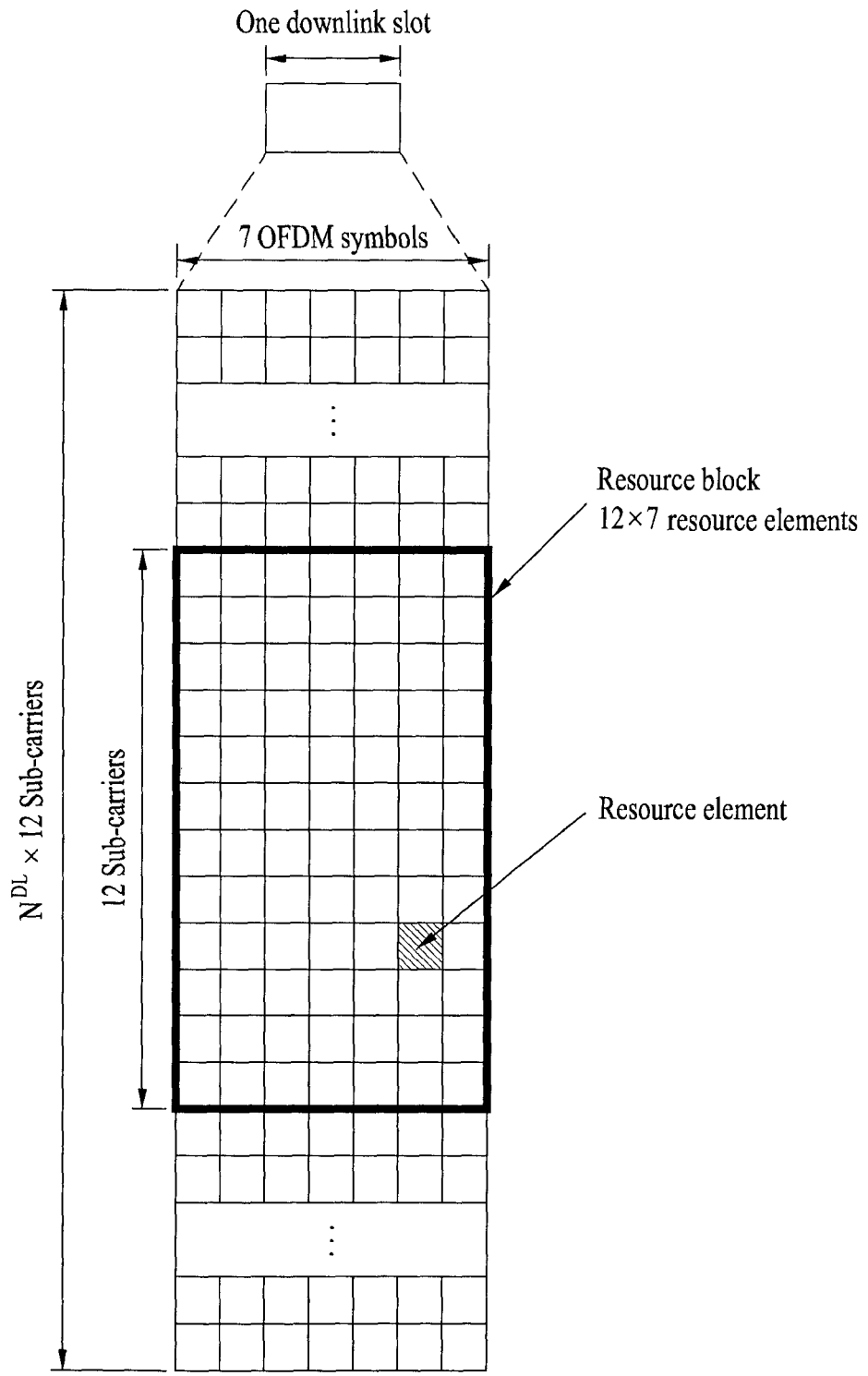
FIG. 3 illustrates a resource grid for one downlink slot.

FIG. 3 illustrates a resource grid for a downlink slot.

Referring to FIG. 3, a downlink slot includes a plurality of OFDM symbols in the time domain. A downlink slot includes 7 OFDM symbols in the time domain and an RB includes 12 subcarriers in the frequency domain, which does not limit the scope and spirit of the present invention.

Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 4:
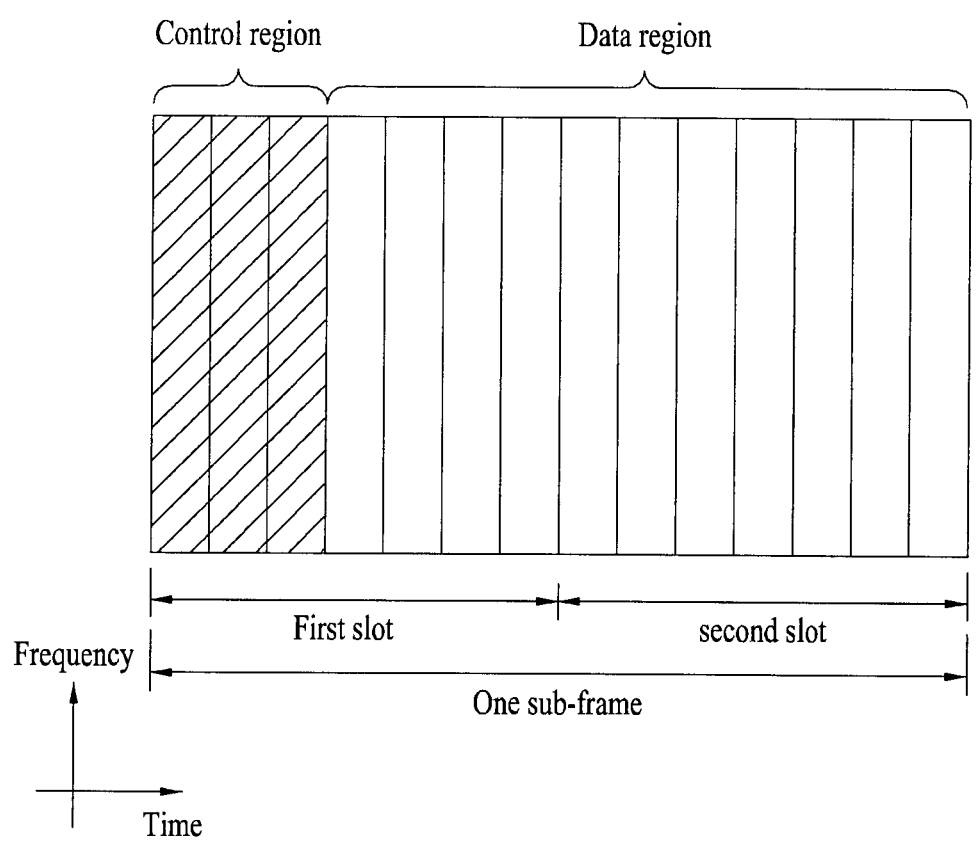
FIG. 4 illustrates a downlink subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PC- FICH), a physical downlink control channel (PDCCH), and a physical hybrid automatic repeat request (ARQ) indicator channel (PHICH).

The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group.

Figure 5:
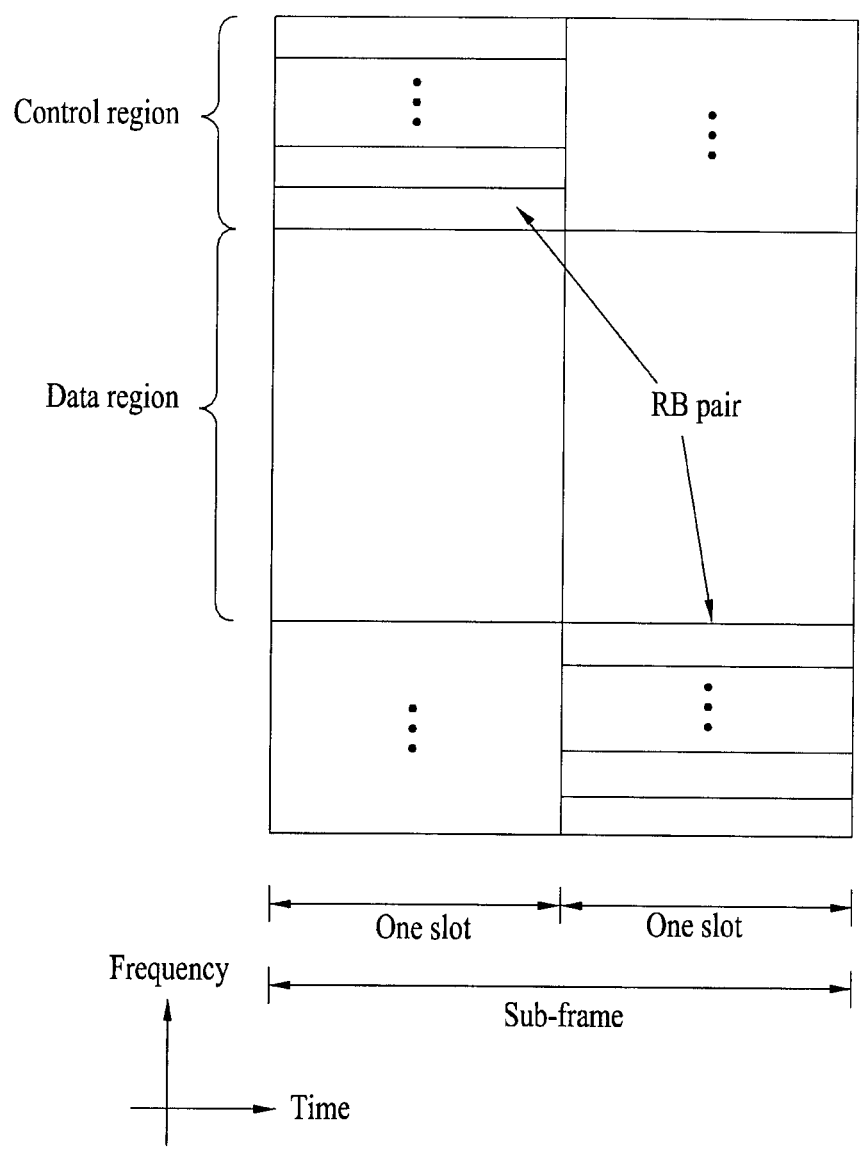
FIG. 5 illustrates an uplink subframe structure.

FIG. 5 illustrates an uplink subframe structure.

Referring to FIG. 5, an uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 6:
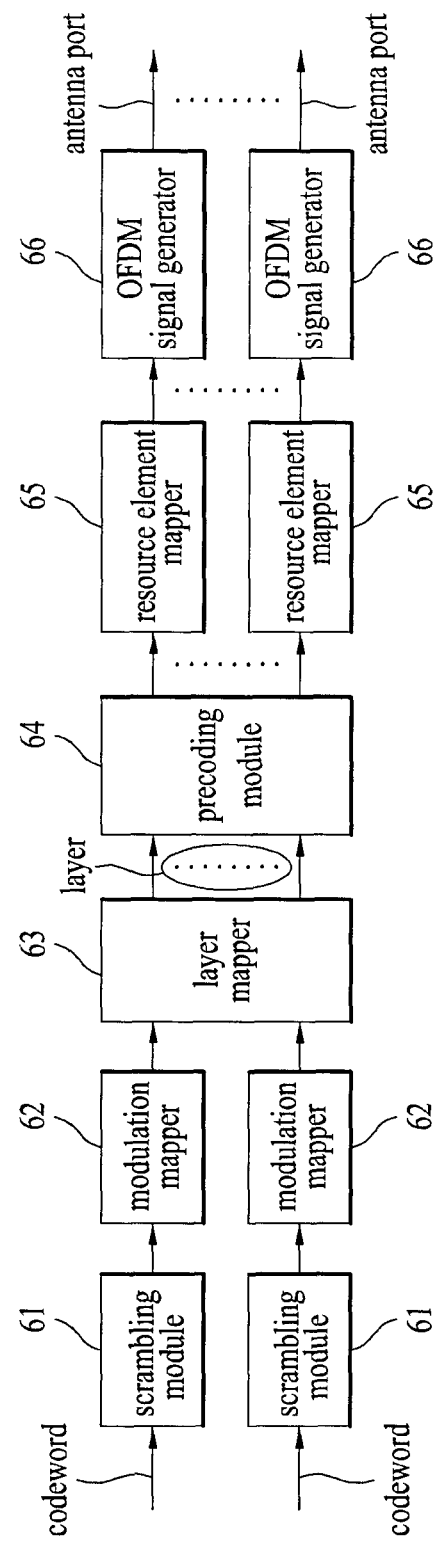
FIG. 6 is a block diagram of a BS processing a downlink signal for transmission.

FIG. 6 is a block diagram of an eNB processing a downlink signal for transmission.

In a 3GPP LTE system, the eNB may transmit one or more codewords on the downlink. The one or more codewords may be processed into complex symbols through a scrambling module 61 and a modulation mapper 62. A layer mapper 63 maps the complex symbols to a plurality of layers. A precoding module 64 may multiply the layers by a precoding matrix and allocate the multiplied layers to respective antennas. Resource element mappers 65 may map the transmission signals for the respective antennas received from the precoding module 64 to time-frequency resource elements. The mapped signals may be transmitted through the respective antennas after being processed in OFDMA signal generators 66.

Figure 7:
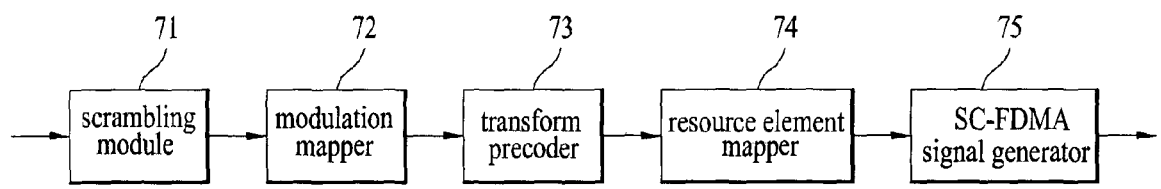
FIG. 7 is a block diagram of a UE for processing an uplink signal for transmission.

FIG. 7 is a block diagram of a UE for processing an uplink signal for transmission.

Referring to FIG. 7, a scrambling module 71 of the UE may scramble a transmission signal with a UE-specific scrambling signal in order to transmit the uplink signal. A modulation mapper 72 modulates the scrambled signal to complex symbols through binary phase shift keying (BPSK), quadrature phase shift keying (QPSK), or 16-ary quadrature amplitude modulation (16QAM) according to the type of the transmission signal and/or a channel status. A transform precoder 73 processes the complex symbols and a resource element mapper 74 may map the processed complex symbols to time-frequency resource elements, for actual transmission. The mapped signal may be transmitted to the eNB through an antenna after being processed in a single carrier-frequency division multiple access (SC-FDMA) signal generator 75.

OFDM has a high peak-to-average power ratio (PAPR) due to superposition of subcarriers because multiple subcarriers are used. Accordingly, as described above with reference to FIGS. 6 and 7, to make up for the shortcoming of high PAPR in a UE that requires high power efficiency, downlink signal transmission uses OFDM whereas uplink signal transmission uses single carrier-frequency division multiple access (SC-FDMA) in a 3GPP system (e.g. LTE system). SC-FDMA is also called discrete Fourier transform-spread OFDM (DFTs OFDM).

1.2. Downlink System

Since data/a signal is transmitted through a radio channel in a wireless communication system, the data/signal may be distorted during transmission. To correctly receive a distorted signal at a receiver, it is preferable to correct the received distorted signal using channel information. Here, a transmitter and/or the receiver can use a reference signal that both the transmitter and the receiver know in order to detect the channel information. The reference signal may be referred to as a pilot signal.

When the transmitter transmit/receives data using MIMO antennas, it is preferable to detect a channel status between a transmit antenna and a receive antenna for correct reception of data at the receiver. Here, to detect a channel status at the receiver, each transmit antenna of the transmitter may have an individual reference signal.

Downlink reference signals include a common reference signal (CRS) shared by all UEs in a cell and a dedicated reference signal (DRS) for a specific. UE only. The transmitter can provide information for modulation and channel measurement to the receiver using these reference signals (CRS and DRS).

The receiver (e.g. a UE) may measure a channel status using the CRS and feed back an indicator related to channel quality, such as a channel quality indicator (CQI), a precoding matrix index (PMI) and/or a rank indicator (RI) to the transmitter (e.g. an eNB) according to the measured channel status. In the embodiments of the present invention, the CRS is referred to as a cell-specific RS. A reference signal related to feedback of channel status information (CSI) may be defined as a CSI-RS.

The DRS can be transmitted to UEs through REs when data modulation on a PDSCH is needed. A UE can receive information about presence of the DRS through higher layer signaling. The DRS is valid only when a PDSCH signal corresponding thereto is mapped. In the embodiments of the present invention, the DRS may be referred to as a UE-specific RS or a demodulation RS (DMRS).

Figure 8:
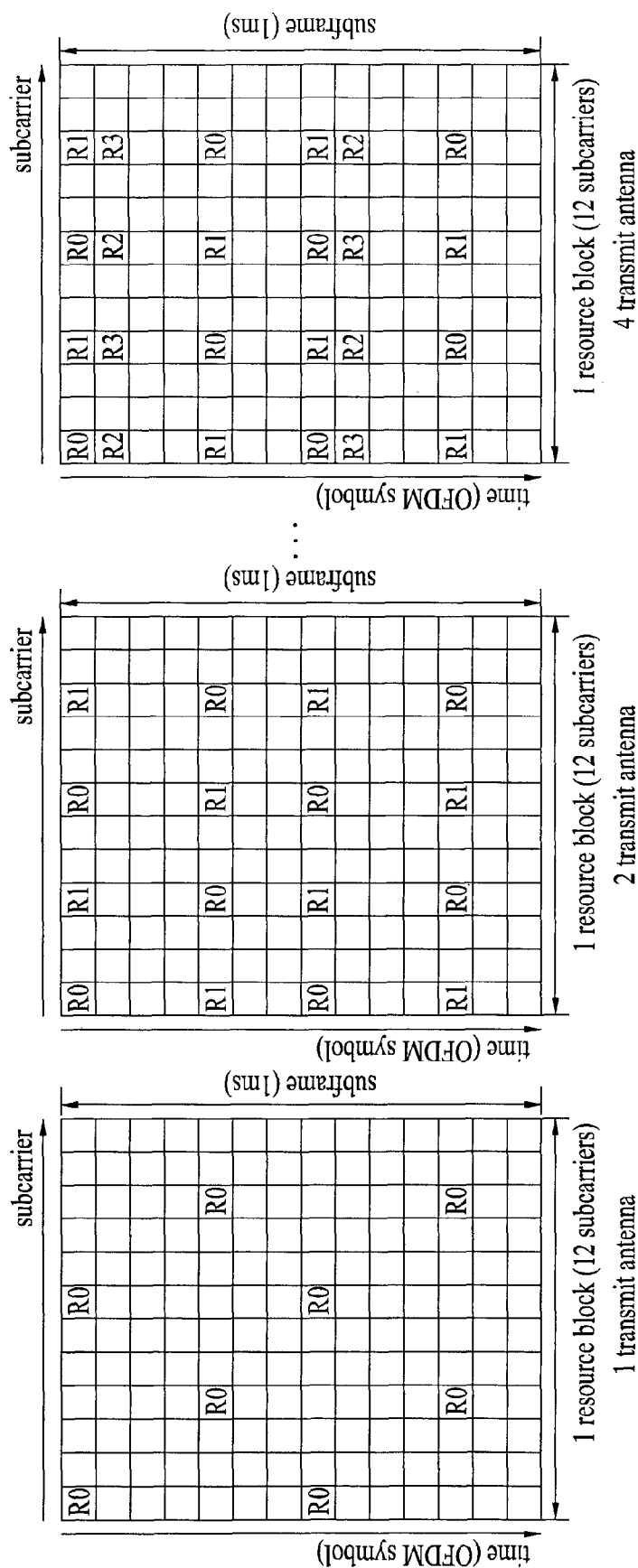
FIG. 8 illustrates downlink reference signal structures for systems respectively having 1, 2 and 4 transmit (Tx) antennas in a normal cyclic prefix (CP) case.

FIG. 8 illustrates downlink RS structures for systems respectively having 1, 2 and 4 transmit (Tx) antennas in a normal CP case.

Referring to FIG. 8, R0, R1, R2 and R3 respectively denote RSs for Tx antennas 0, 1, 2 and 3. Subframes used for the RS of a Tx antenna do not carry signals for Tx antennas other than the Tx antenna in order to eliminate interference.

Figure 9:
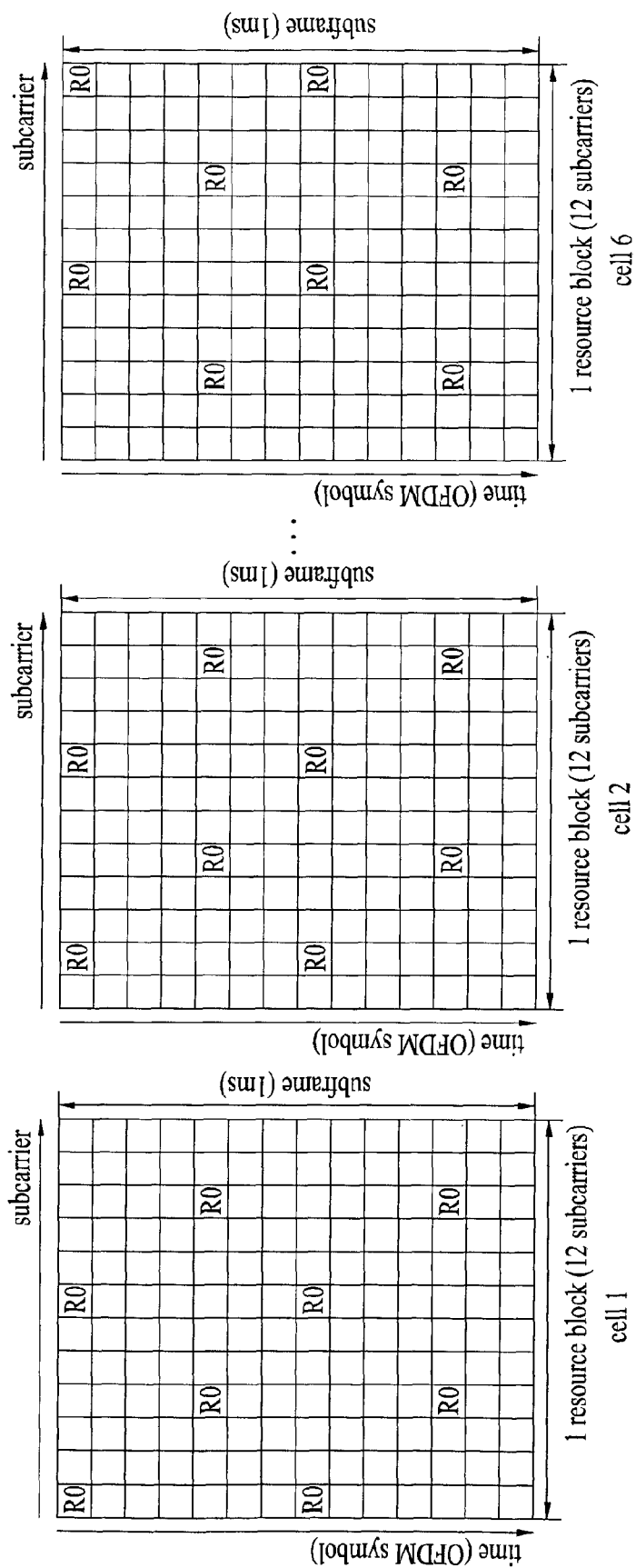
FIG. 9 illustrates downlink reference signal structures based on frequency shifts of a reference signal according to cells in the normal CP case.

FIG. 9 illustrates a downlink RS structure according to frequency shift of an RS for cells.

Referring to FIG. 9, if the RS (or pilot symbol) structure for the system having one Tx antenna shown in FIG. 8 is used for cell 1, RSs can be protected through subcarrier-based or OFDM symbol-based shift in the frequency domain or time domain in cell 2 and cell 3 to prevent collision of RSs between the cells. For example, in the case of the system having one Tx antenna, as shown in FIG. 9, RSs can be located at an interval of 6 subcarriers in the frequency domain. Accordingly, at least 5 neighboring cells can have RSs located at different positions in the frequency domain through shift on a subcarrier basis in the frequency domain.

Additionally, interference of RSs received from neighboring cells can be reduced at the receiver by multiplying a downlink RS for each cell by a pseudo-random sequence and transmitting the downlink RS, to thereby improve channel estimation performance. The PN sequence is applied for each OFDM symbol in a subframe and may vary according to cell identifier (ID), subframe number (or index) and OFDM symbol position.

Figure 10:
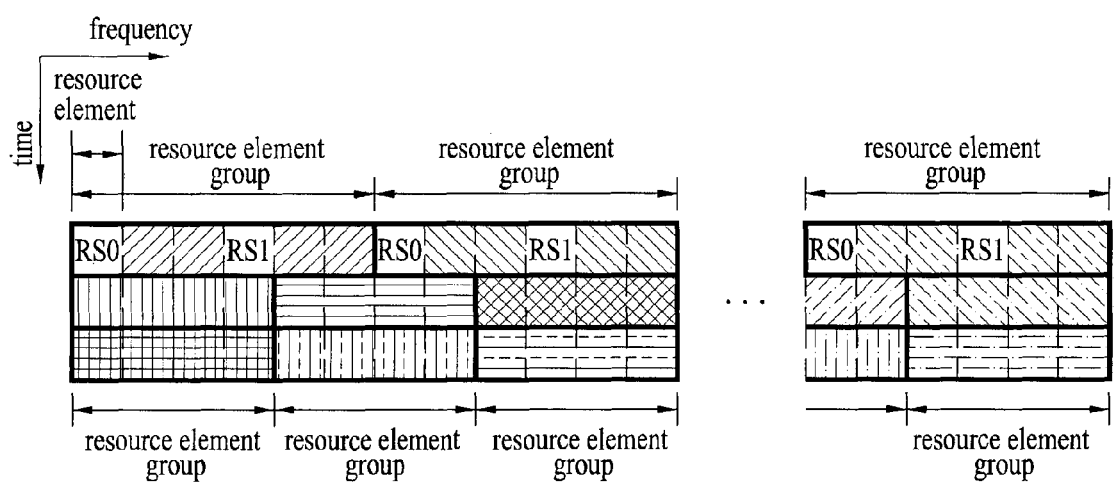
FIG. 10 illustrates downlink control channel resource configuration in a system having one or two Tx antennas.
Figure 11:
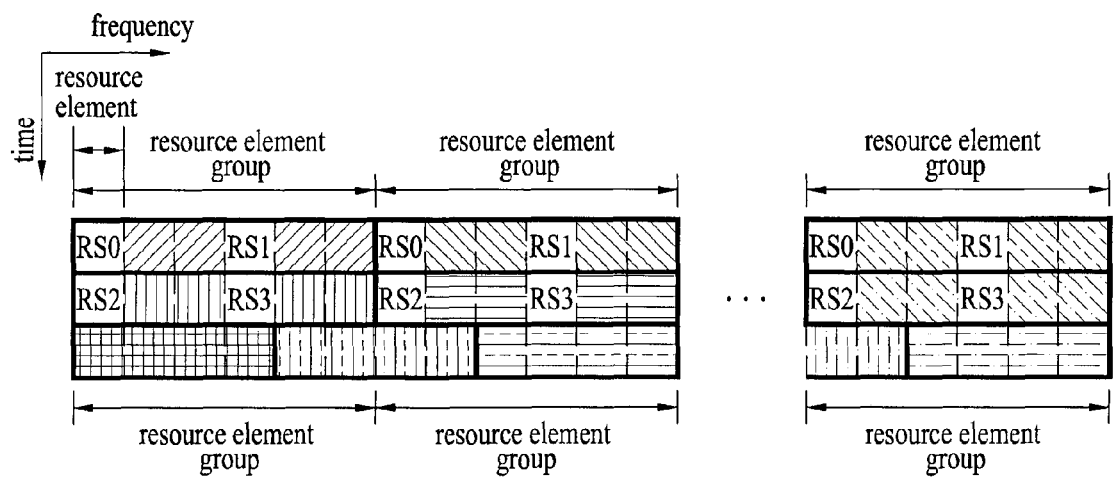
FIG. 11 illustrates downlink control channel resource configuration in a system having four Tx antennas.

Resources can be configured, as shown in FIGS. 10 and 11, in order to allocate the aforementioned downlink control channel to each subframe.

FIG. 10 illustrates downlink control channel resource configuration in a system having one or two Tx antennas and FIG. 11 illustrates downlink control channel resource configuration in a system having four Tx antennas. In FIGS. 10 and 11, R0, R1, R2 and R3 denote RSs (or pilot symbols) for transmit antennas 0, 1, 2 and 3, respectively.

Referring to FIGS. 10 and 11, the downlink control channel are configured of resource element groups (REGs). An REG is used to define mapping of a control channel to a resource element (RE) and may be composed of contiguous REs in four frequency domains except REs used for RS transmission. A specific number of REGs may be used as the downlink control channel as necessary. Here, an RE is used as a subcarrier.

A PCFICH will now be described in detail.

The PCFICH is transmitted through the first OFDM symbol (OFDM symbol #0) of each subframe. The PCFICH may be transmitted through one antenna or using a transmit diversity scheme. A UE receives control information transmitted on a PDCCH after checking control information transmitted through the PCFICH when receiving a subframe.

An eNB may transmit a PDCCH between OFDM symbols #0 to #2 for each subframe for resource allocation information of each subframe and send downlink control channel information through OFDM symbol #0, OFDM symbols #0 and #1, or OFDM symbols #0 to #2 according to downlink control channel capacity. In this manner, the number of OFDM symbols used for the downlink control channel can be changed on a subframe-by-subframe basis. The PCFICH signals information about the number of OFDM symbols used for the downlink control channel. Accordingly, the PCFICH needs to be transmitted for every subframe.

Control information transmitted through the PCFICH is referred to as a control format indicator (CFI). For example, the CFI can be 1, 2 or 3 and can represent the number of OFDM symbols used for PDCCH transmission in a subframe. This is exemplary and information represented by the CFI can vary according to system bandwidth. For example, when the system bandwidth is less than a specific threshold value, CFI values 1, 2 and 3 can represent that the number of OFDM symbols used for PDCCH transmission in a subframe are 2, 3 and 4, respectively.

Table 1 shows the CFI of the PCFICH and a 32-bit CFI codeword generated by channel-coding the CFI.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Referring to Table 1, CFI=1 represents that a PDCCH is transmitted using OFDM symbol #0 only, and CFI=2 and CFI=3 represent that the PDCCH is transmitted using OFDM symbols #0 and #1 and OFDM symbols #0 to #2, respectively.

The CFI codeword may be modulated using a quadrature phase shift keying (QPSK) scheme. In this case, the 32-bit codeword is modulated to 16 symbols. Accordingly, 16 subcarriers are used for PCFICH transmission.

Figure 12:
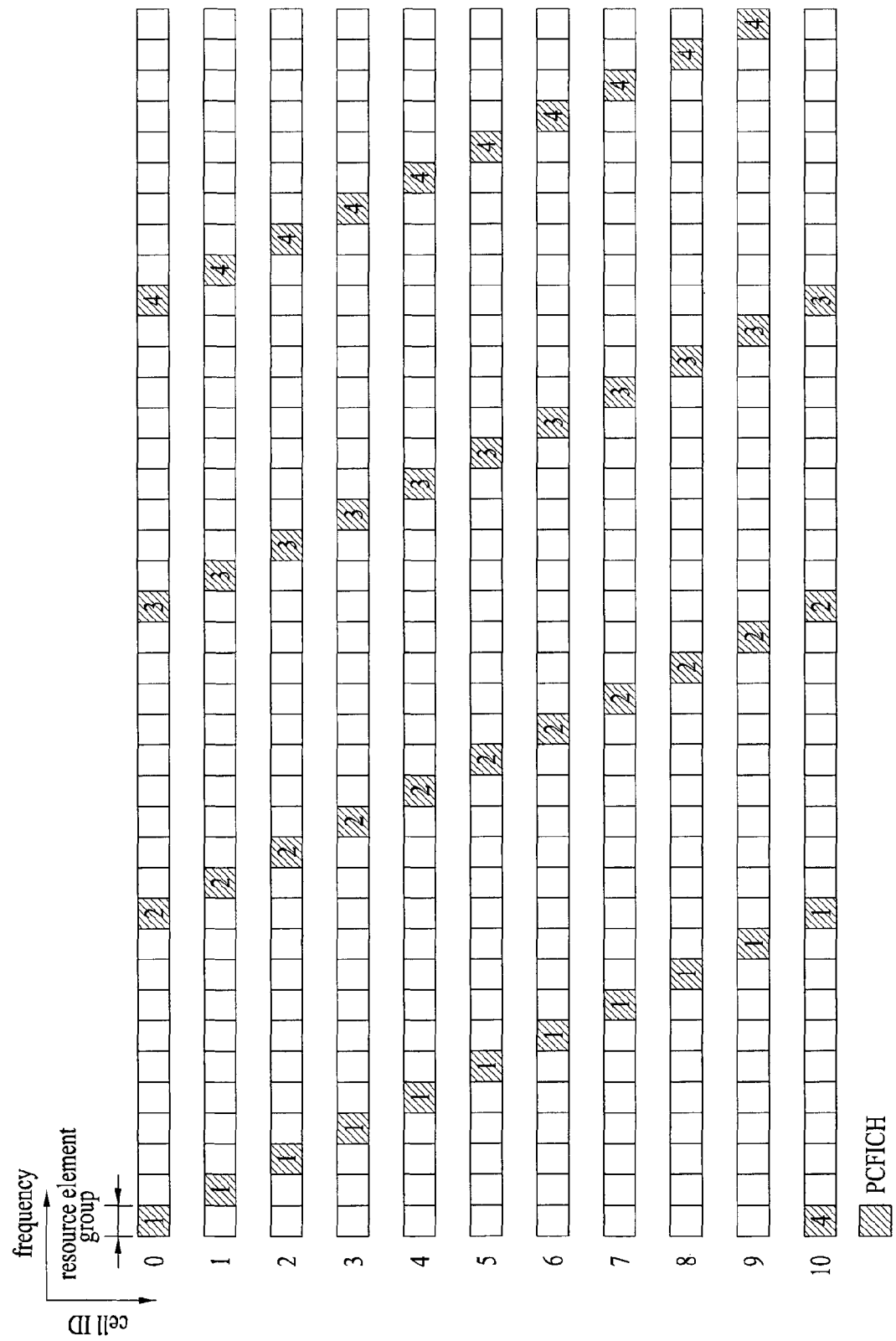
FIG. 12 illustrates a PCFICH transmission form.

FIG. 12 illustrates a PCFICH transmission form.

Referring to FIG. 12, an REG includes 4 subcarriers and is composed of only data subcarriers other than RSs. Since 16 subcarriers are used for PCFICH transmission, as described above, 4 REGs can be used for PCFICH transmission. REGs to which the PCFICH is mapped may vary according to the number of RBs in the frequency domain. To prevent inter-cell interference of the PCFICH, the REGs to which the PCFICH is mapped may be shifted in the frequency domain according to cell ID. Since the PCFICH is transmitted using the first OFDM symbol of a subframe all the time, a receiver checks information of the PCFICH first and then receives information of a PDCCH when receiving a subframe.

A description will be given of a PHICH.

The PHICH transmits ACK/NACK information for an uplink data channel. A plurality of PHICHs forms a PHICH group such that they are mapped to the same REG. PHICHs in a PHICH group may be identified by different sequences. For example, orthogonal sequences can be used for identifying the PHICHs in the PHICH group. One PHICH group includes PHICH channels for a plurality of UEs. A plurality of PHICH groups may be generated in a subframe. ACK/NACK information transmitted through a PHICH may be repeated three times and spread four fold to generate 12 symbols. In this case, 3 REGs can be used for PHICH transmission.

Figure 13:
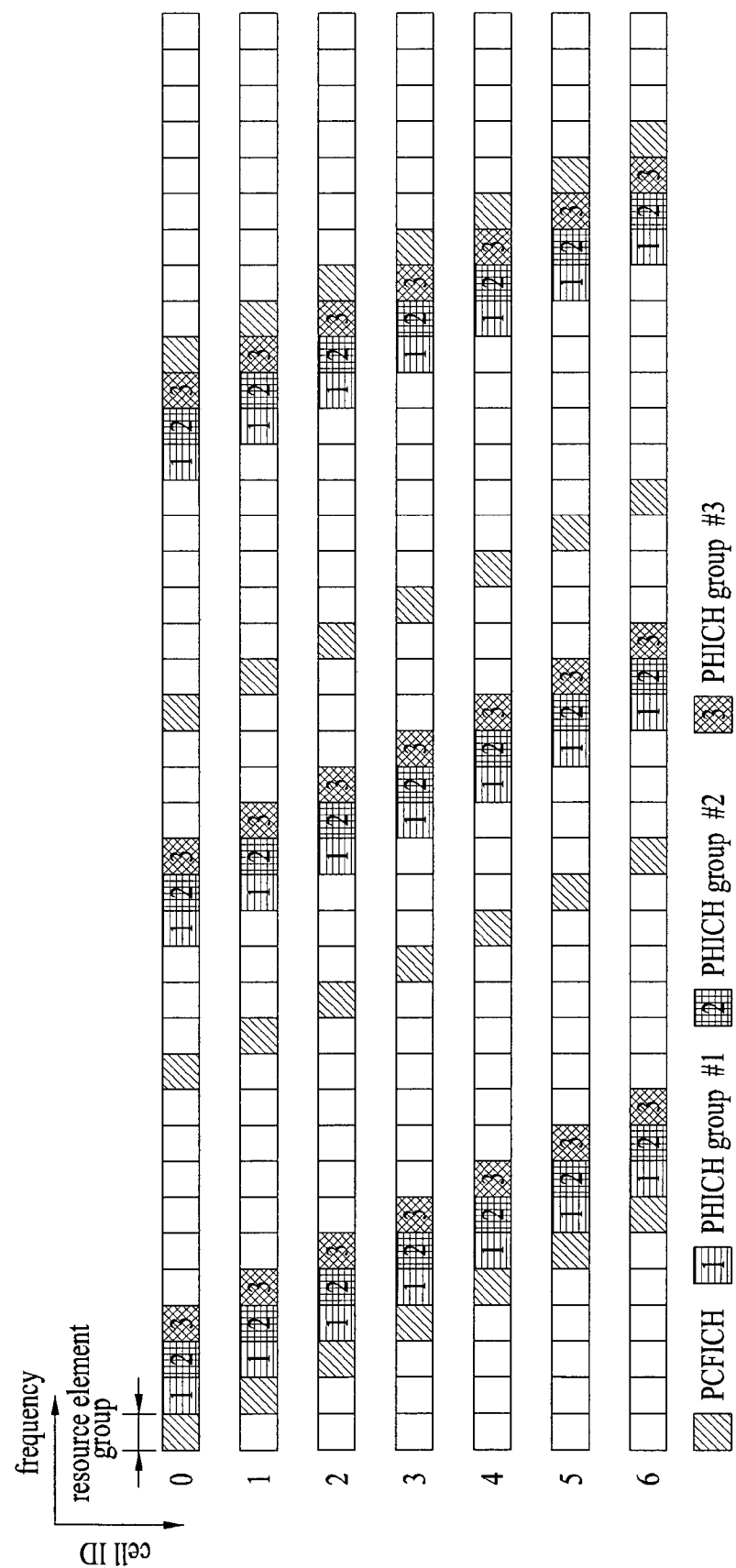
FIG. 13 illustrates an example of mapping PCFICHs and PHICHs to REGs.

FIG. 13 illustrates an example of mapping PCFICHs and PHICHs to REGs.

Referring to FIG. 13, 3 PHICH groups are exemplified. Each PHICH group is mapped an REG to which a PCFICH is not mapped. The PHICHs groups are transmitted through 3 REGs. The REG to which each PHICH group is mapped is shifted in the frequency domain according to cell ID to prevent inter-cell interference.

PHICHs are allocated to UEs using the lowest physical resource block (PRB) index of PUSCH resource allocation and cyclic shift of a DMRS transmitted on uplink grant. A PHICH resource is signaled as an index pair such as $(n_{PHICH}^{group}, n_{PHICH}^{seq})$. Here, $n_{PHICH}^{group}$ denotes a PHICH group number and $n_{PHICH}^{seq}$ denotes an orthogonal sequence index in the corresponding PHICH group.

Table 2 shows an exemplary orthogonal sequence used in the 3GPP LTE system.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The above-mentioned $n_{PHICH}^{group}$ and $n_{PHICH}^{seq}$ can be obtained using the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In Equation 1, $n_{DMRS}$ represents frequency shift of a DMRS used for uplink transmission related to a PHICH, $N_{SF}^{PHICH}$ represents a spreading factor used for the PHICH, $I_{PRB\_RA}^{lowest\_index}$ denotes the lowest RPB index of uplink resource allocation, and $N_{PHICH}^{group}$ denotes the number of PHICH groups.

$N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

In Equation 2, $N_g$ denotes 2-bit ($N_g \in \{1/6, 1/2, 1, 2\}$) information about the quantity of PHICH resources transmitted on a physical broadcast channel (PBCH) and $N_{RB}^{DL}$ denotes the number of RBs on downlink.

Figure 14:
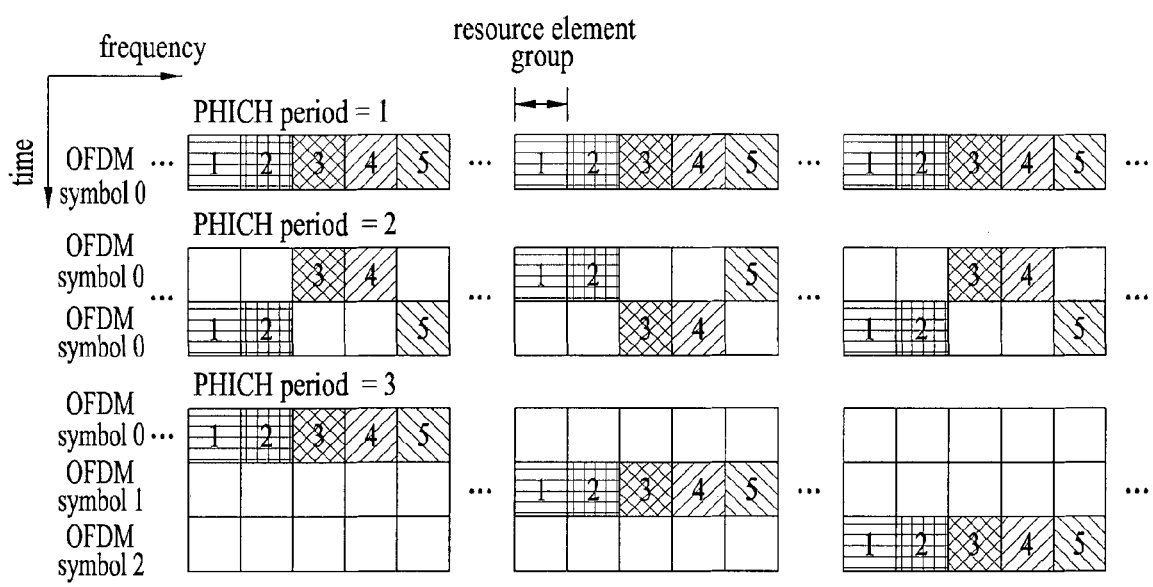
FIG. 14 illustrates a PHICH group configuration in a subframe according to PHICH duration.

FIG. 14 illustrates a PHICH group configuration in a subframe according to PHICH duration.

As shown in FIG. 14, a PHICH group may be composed of different time regions in a subframe according to PHICH durations {1, 2, 3}.

A description will be given of a PDCCH.

Control information transmitted through a PDCCH is referred to as downlink control information (DCI). A PDCCH has a control information size and usage which vary according to DCI format and its size may vary according to coding rate.

Table 3 shows DCI according to DCI format.

TABLE 3

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

Referring to Table 3, DCI formats include format 0 for PUSCH scheduling, format 1 for scheduling of one PDSCH codeword, format 1A for compact scheduling of one PDSCH codeword, format 1C for compact scheduling of DL-SCH, format 2 for PDSCH scheduling in a closed-loop spatial multiplexing mode, format 2A for PDSCH scheduling in an open loop spatial multiplexing mode, and formats 2 and 3A for transmission of transmission power control (TPC) commands for uplink channels. DCI format 1A can be used for PDSCH scheduling irrespective of the transmission mode of a UE.

The DCI format can be independently applied to each UE, and PDCCHs of multiple UEs can be simultaneously multiplexed in a subframe. A PDCCH is composed of an aggregation of one or several contiguous control channel elements (CCEs). A CCE is a logical allocation unit used to provide a coding rate depending on a radio channel status to a PDCCH. The CCE corresponds to 9 sets of REGs each including 4 REs. An eNB may use {1, 2, 4, 8} CCEs to configure one PDCCH signal. Here, {1, 2, 4, 8} are referred to as CCE aggregation levels. The number of CCEs used to transmit a specific PDCCH is determined by the eNB according to channel status. A PDCCH configured according to each UE is interleaved and mapped to a control channel region of each subframe and according to a CCE-to-RE mapping rule. A PDCCH position may depend on the number of OFDM symbols for a control channel of each subframe, the number of PHICH groups, transmit antenna, frequency shift, etc.

As described above, channel coding is independently performed on multiplexed PDCCHs of UEs and cyclic redundancy check (CRC) is applied thereto. The CRC is masked with an ID of each UE such that each UE can receive a PDCCH allocated thereto. However, the eNB does not provide information about the position of a PDCCH corresponding to a UE in a control region assigned in a subframe. To receive a control channel transmitted from the eNB, the UE finds the PDCCH assigned thereto by monitoring a set of PDCCH candidates in a subframe because the UE cannot be aware of the position of the PDCCH and a CCE set aggregation level or a DCI format used for the PDCCH. This is called blinding decoding (BD). Blind decoding may also be called blind detection or blind search. Blind decoding is a method by which a UE de-mask a CRC with ID thereof and check a CRC error to confirm whether a corresponding PDCCH is a control channel for the UE.

A description will be given of uplink retransmission.

An uplink retransmission scheme can be configured using the aforementioned PHICH and DCI format 0 (PUSCH scheduling). Synchronous non-adaptive retransmission is performed by receiving ACK/NACK through the PHICH and synchronous adaptive retransmission is carried out through DCI format 1. That is, both the PHICH and DCI format 0 support synchronous retransmission only. Synchronous retransmission needs to be performed within a predetermined time after transmission of the first packet.

In the case of non-adaptive retransmission performed through the PHICH, transmission is performed using the same transmission method in the same PRB region used to transmit the first packet. In adaptive retransmission using DCI format 0, transmission is carried out using a PRB and a transmission method according to scheduling information. In this case, if a UE simultaneously receive PHICH scheduling information and PUSCH scheduling information, the UE ignores a PHICH and transmits a signal according to the PUSCH scheduling information. When a new data indicator (NDI) included in the PUSCH scheduling information is toggled, the UE compares the current state with the previous state and flushes a buffer upon regarding previous packet transmission as successful transmission. However, if the NDI is not toggled even when the UE receives ACK through the PHICH, the UE maintains the buffer for the previous packet.

1.3. Uplink System

As described above, a UE that regards power efficiency as an important factor uses SC-FDMA capable of lowering PAPR (or cubic metric (CM) and achieving efficient transmission by avoiding a non-linear distortion interval of a power amplifier.

Figure 15:
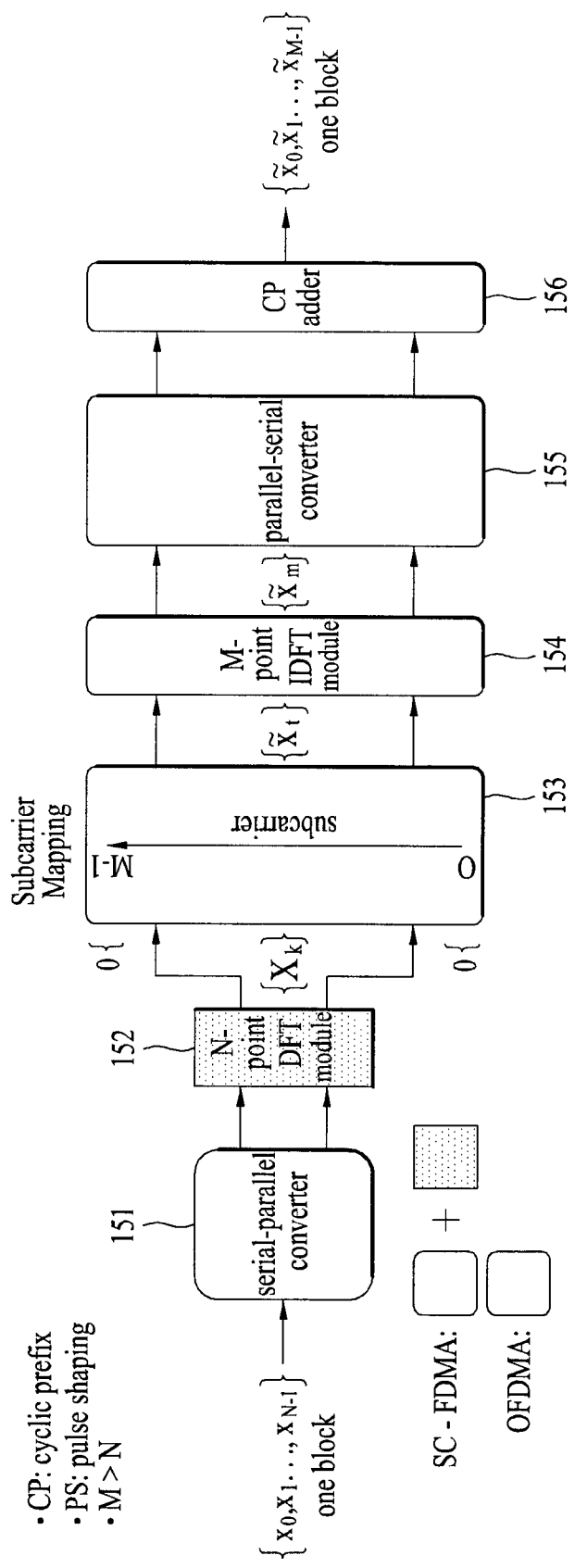
FIG. 15 illustrates SC-FDMA and OFDMA schemes.

FIG. 15 illustrates SC-FDMA and OFDMA schemes.

Referring to FIG. 15, both a UE for uplink signal transmission and an eNB for downlink signal transmission include a serial-to-parallel converter 151, a subcarrier mapper 153, an M-point IDFT module 154, a parallel-to-serial converter 155, and a CP addition module 156.

A UE for transmitting a signal in SC-FDMA additionally includes an N-point DFT module 152. N data symbols generated through the serial-to-parallel converter 151 are applied to the N-point DFT module 152. Here, the N data symbol components are spread over an allocated band. If a band corresponding to N subcarriers is assigned to the UE, the output signal of the N-point DFT module 152 is mapped to an allocated position in the entire uplink system band (input of the M-point IDFT module). That is, the N-point DFT module 152 partially offsets the influence of IDFT of the M-point IDFT module 154 such that a transmission signal has single carrier property.

FIG. 16 illustrates signal mapping schemes in the frequency domain to satisfy single carrier property in the frequency domain.

FIG. 16($a$) illustrates a localized mapping scheme and FIG. 16($b$) illustrates a distributed mapping scheme. 3GPP LTE defines the localized mapping scheme.

Clustered SC-FDMA, a modified form of SC-FDMA, divides DFT process output samples into sub-groups in a mapping procedure and discontinuously maps the sub-groups to subcarrier regions. Clustered SC-FDMA may include a filtering process and a cyclic extension process as necessary. A sub-group may be called a cluster and cyclic extension means insertion of a guard interval longer than maximum delay spread of a channel between contiguous symbols to prevent inter-symbol interference during transmission of subcarrier symbols through a multi-path channel.

Figure 17:
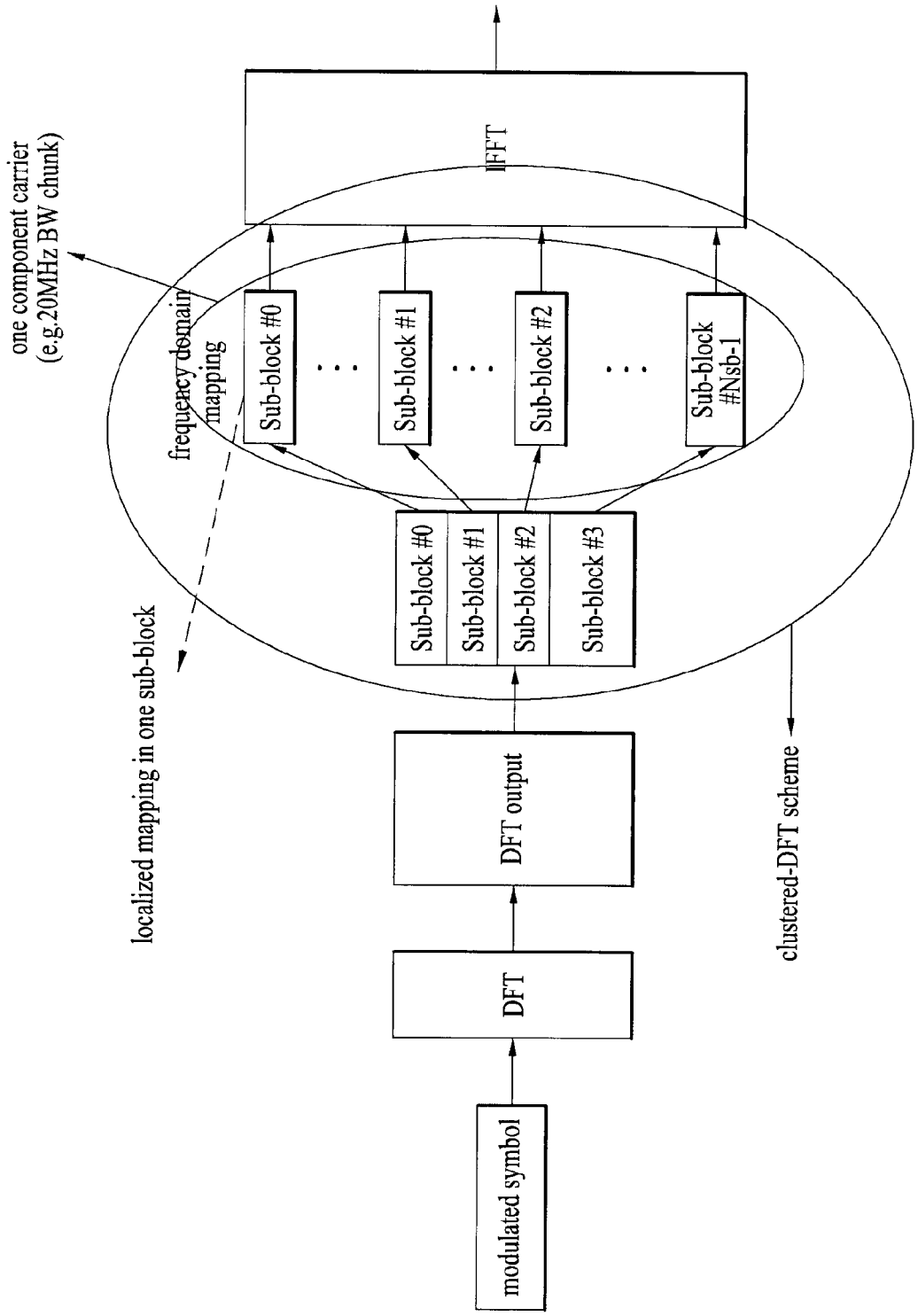
FIG. 17 illustrates a signal processing procedure for mapping DFT process output samples to a single carrier in clustered SC-FDMA.
Figure 18:
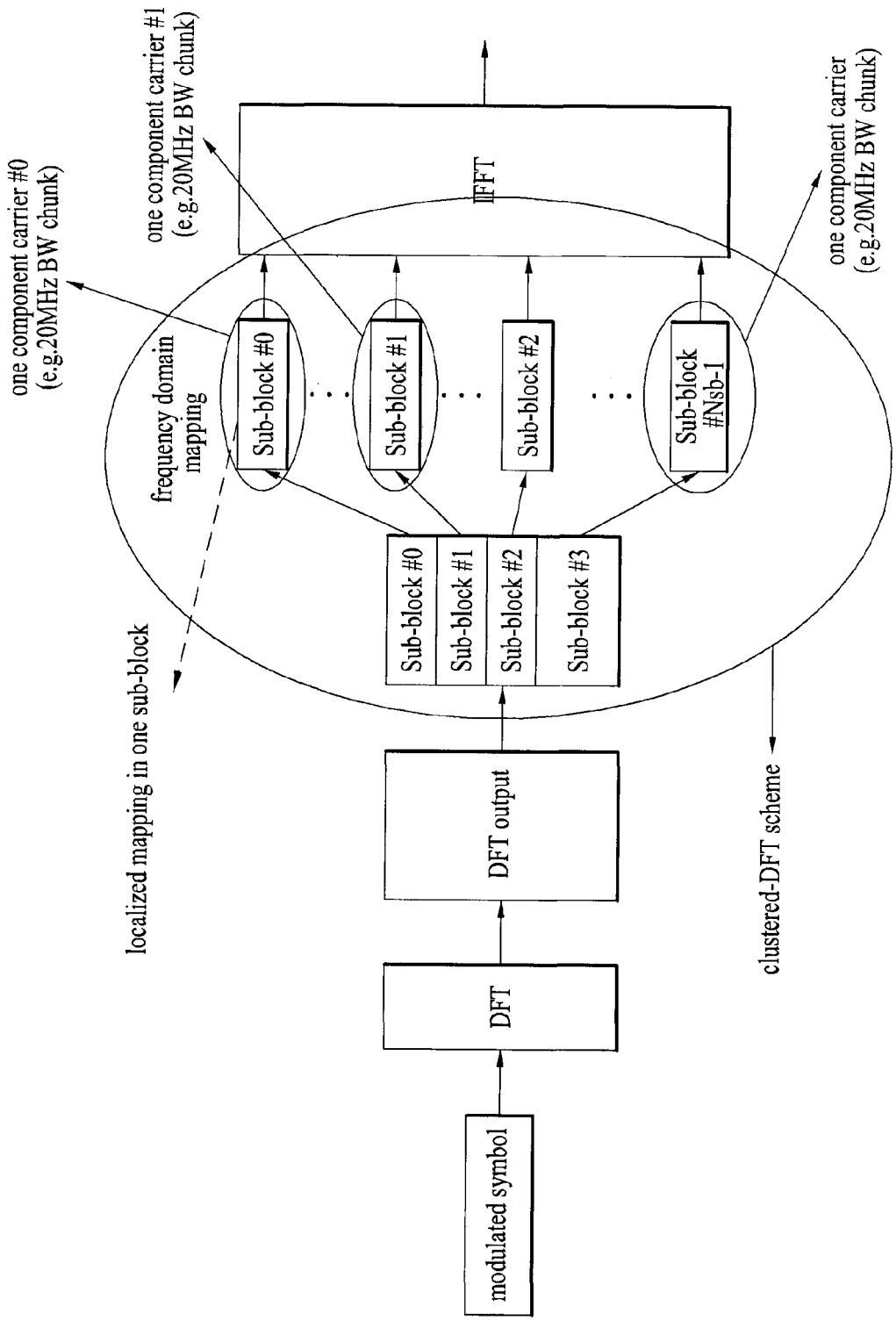
FIGS. 18 and 19 illustrate signal processing procedures of mapping DFT process output samples to multiple carriers in clustered SC-FDMA.
Figure 19:
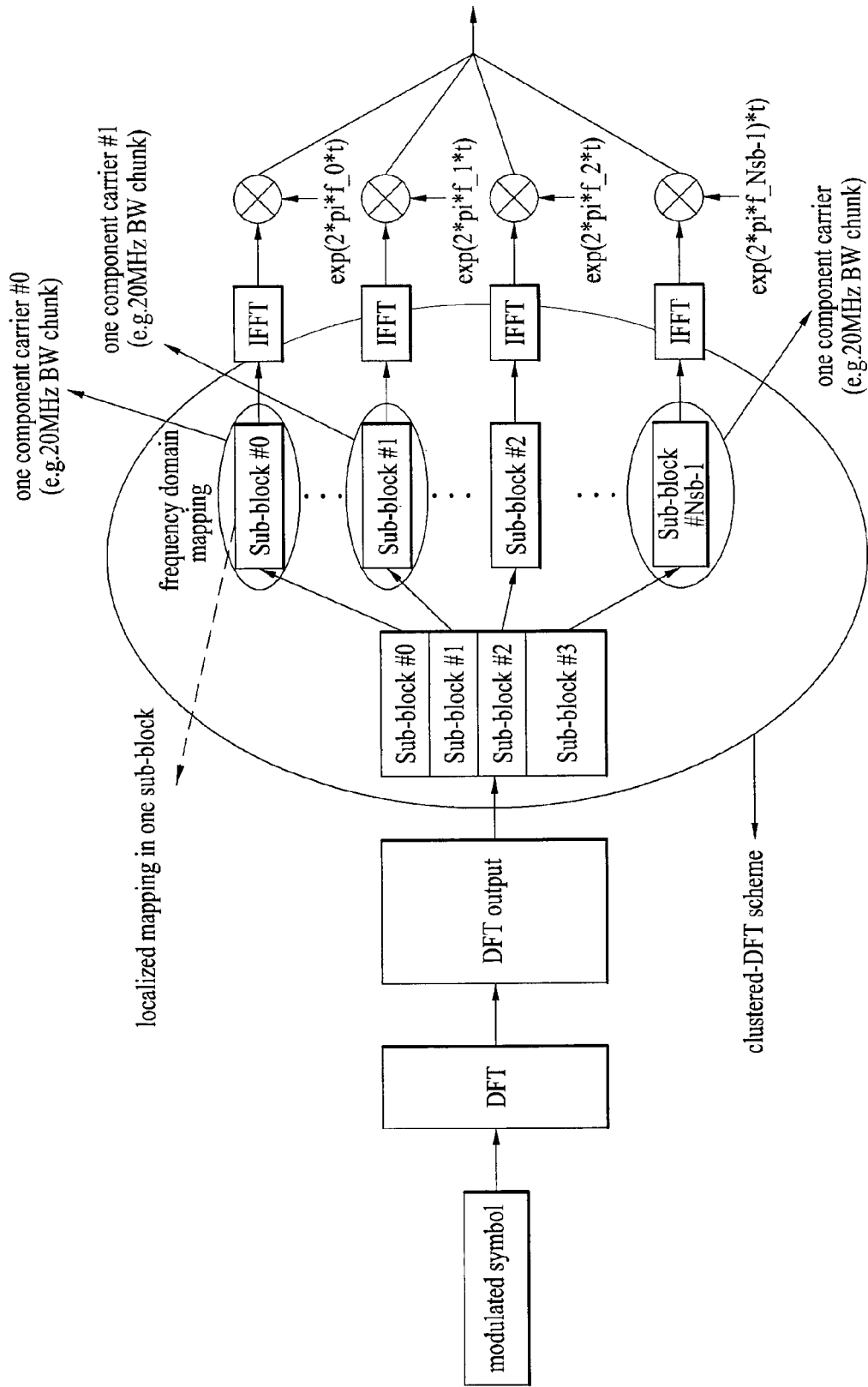

FIG. 17 illustrates a signal processing procedure for mapping DFT process output samples to a single carrier in clustered SC-FDMA and FIGS. 18 and 19 illustrate signal processing procedures of mapping DFT process output samples to multiple carriers in clustered SC-FDMA.

FIG. 17 shows an example of using clustered SC-FDMA for intra-carrier and FIGS. 18 and 19 show examples of using clustered SC-FDMA for inter-carrier. Furthermore, FIG. 18 illustrates a case in which a signal is generated through a single IFFT block when contiguous component carriers are allocated in the frequency domain and a subcarrier spacing is aligned between neighboring component carriers. FIG. 19 illustrates a case in which a signal is generated through a plurality of IFFT blocks due to non-contiguous component carriers when component carriers are non-contiguously allocated in the frequency domain.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in a one-to-one correspondence. While the term 'segmented SC-FDMA' is adopted herein, it may also be called NxSC-FDMA or NxDFT spread OFDMA (NxDFT-s-OFDMA).

Figure 20:
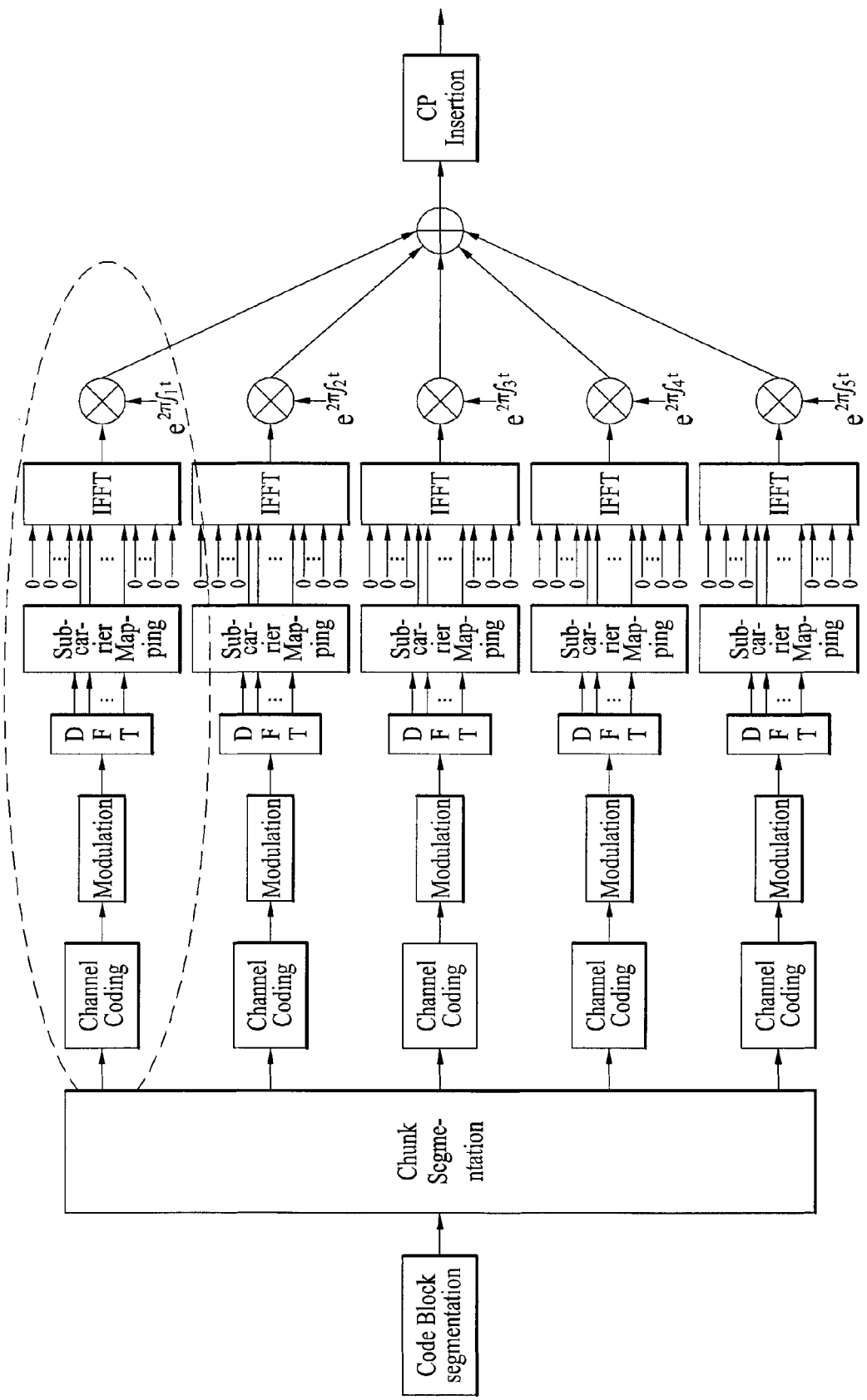
FIG. 20 illustrates a signal processing procedure in segmented SC-FDMA.

FIG. 20 illustrates a signal processing operation in a segmented SC-FDMA system.

Referring to FIG. 20, segmented SC-FDMA is characterized in that total time-domain modulation symbols are divided into N groups (N being an integer greater than 1) and a DFT process is performed on a group-by-group basis to relieve the single carrier property constraint.

Figure 21:
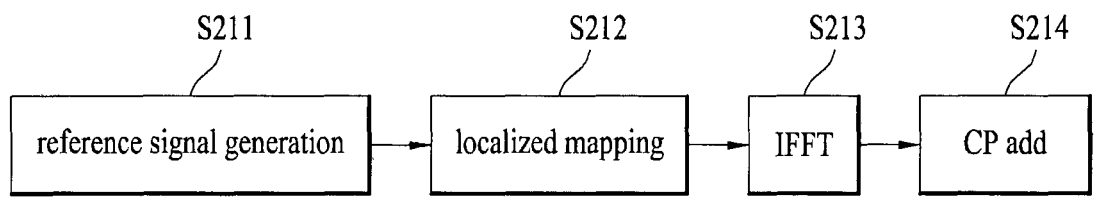
FIG. 21 illustrates a signal processing procedure for transmitting a reference signal on uplink.

FIG. 21 illustrates a signal processing procedure for transmitting an RS on uplink. While a data part is generated as a signal in the time domain, mapped to the frequency domain through a DFT precoder, and transmitted through IFFT, the RS does not pass through the DFT precoder. The RS is directly generated in the frequency domain (S211), and then sequentially subjected to localized mapping (S212), IFFT (S213) and CP addition (S214) to be transmitted.

Figure 22:
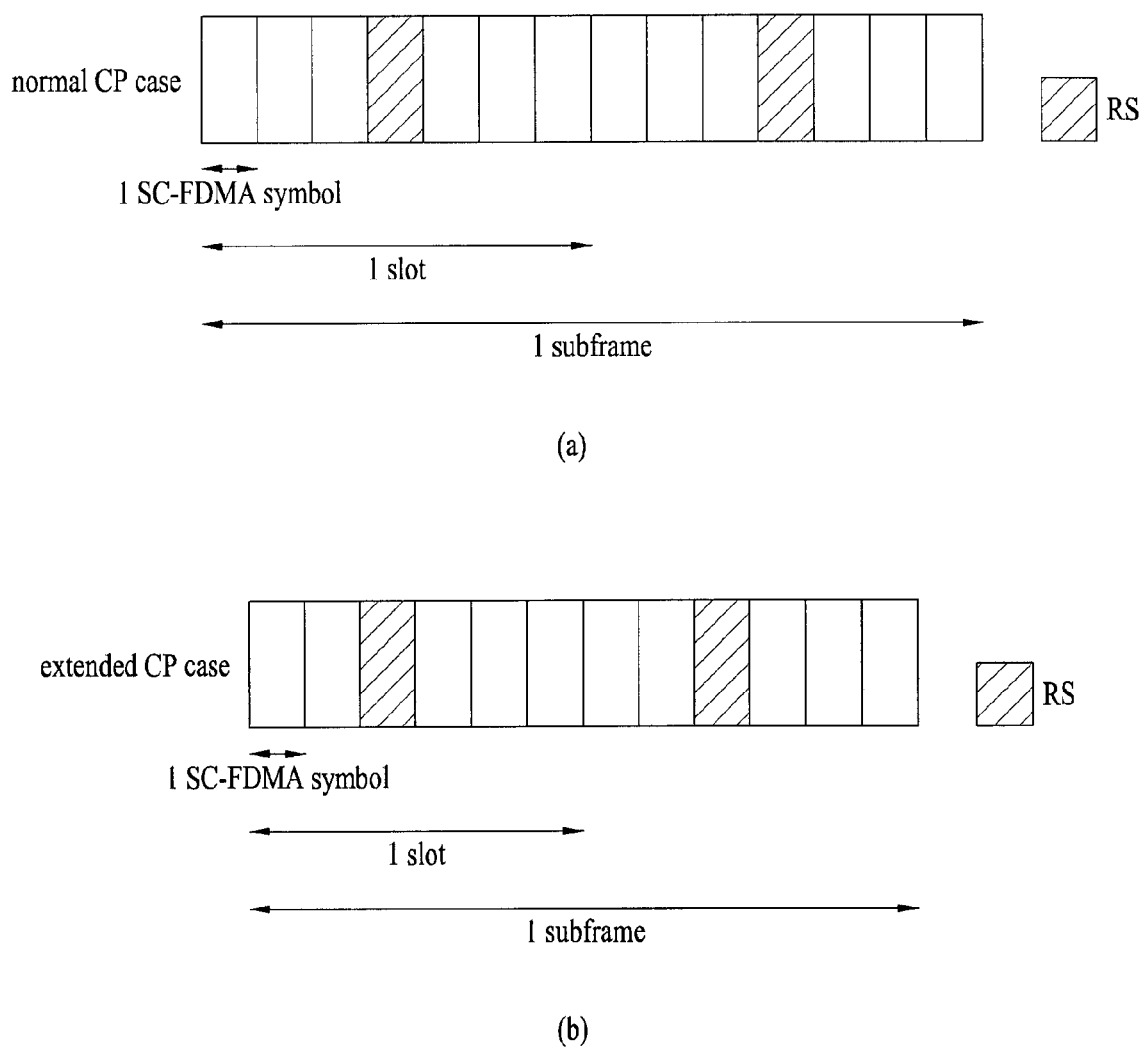
FIG. 22 illustrates subframe structures for transmitting a reference signal.

FIG. 22 illustrates a subframe structure for transmitting RSs.

FIG. 22($a$) illustrates a subframe structure for transmitting RSs in case of a normal CP and FIG. 22($b$) illustrates a subframe structure for transmitting RSs in case of an extended CP. Referring to FIG. 22($a$), RSs are transmitted in fourth and eleventh SC-FDMA symbols in the normal CP case. Referring to FIG. 22($b$), RSs are transmitted in third and ninth SC-FDMA symbols in the extended CP case.

2. Enhanced PDCCH (e-PDCCH) Transmission Method

A 3GPP LTE-A system, an extended form of the 3GPP LTE system, supports extension to a multi-carrier environment, multi-user MIMO (MU MIMO), and a heterogeneous network including a relay, femto cell, hotzone cell, etc.

In the 3GPP LTE-A system, it is difficult to use the conventional 3GPP LTE downlink control channel to maximize the performance of the above-mentioned techniques. Accordingly, an enhanced PDCCH (e-PDCCH) can be introduced to the 3GPP LTE-A system to increase PDCCH capacity of the conventional LTE system. The e-PDCCH can also be called an advanced PDCCH (A-PDCCH). In the following description, the enhanced/advanced PDCCH is referred to as 'e-PDCCH', the conventional PDCCH is referred to as 'legacy PCCH', a UE of the 3GPP LTE-A system (e.g. a system superior to 'LTE release-11') is referred to as 'enhanced UE (e-UE)', and a UE of the 3GPP LTE system (e.g. a system inferior to 'LTE release-10') is referred to as 'legacy UE' for convenience of description.

When the e-PDCCH is introduced in order to increase PDCCH capacity, as described above, the e-PDCCH can be multiplexed with a PDSCH in a PDSCH region and transmitted.

Figure 23:
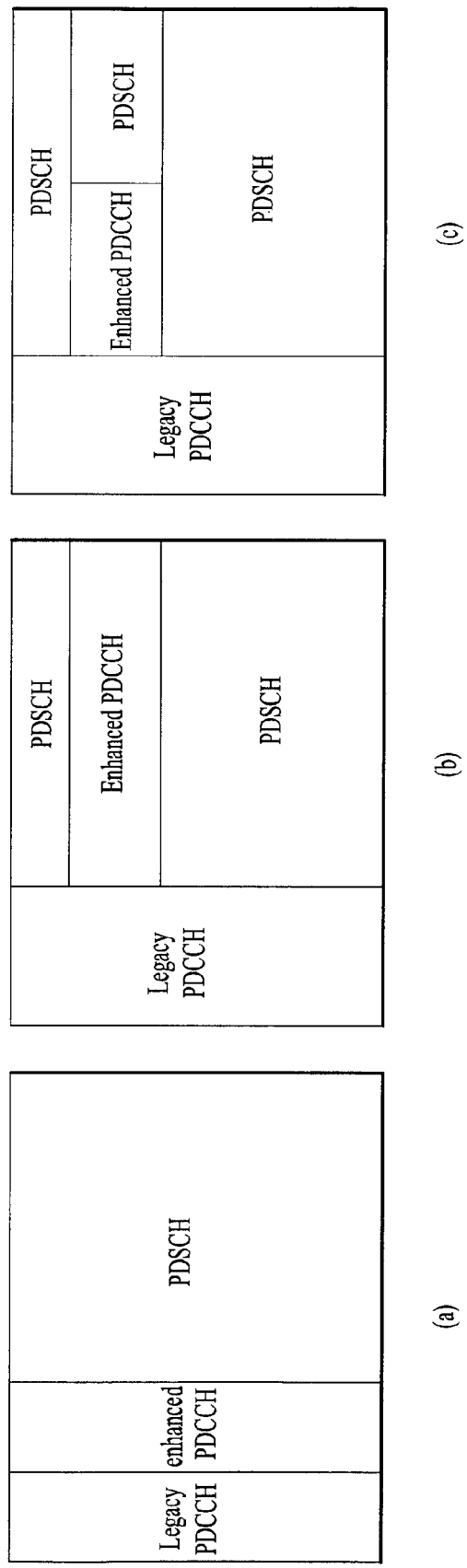
FIG. 23 illustrates exemplary e-PDCCH structures.

FIG. 23 illustrates exemplary e-PDCCH structures.

FIG. 23($a$) shows a structure in which the e-PDCCH is multiplexed with a PDSCH in TDM, FIG. 23($b$) shows a structure in which the e-PDCCH is multiplexed with a PDSCH in FDM, and FIG. 23($c$) shows a structure in which the e-PDCCH is multiplexed with a PDSCH in FDM/TDM.

When the e-PDCCH is multiplexed with a PDSCH in TDM and transmitted, this impacts a legacy UE in normal subframes, and thus a corresponding subframe needs to be configured as a multimedia broadcast single frequency network (MBSFN) subframe. When the e-PDCCH is multiplexed with a PDSCH in FDM or FDM/TDM and transmitted, it is possible to transmit the e-PDCCH even through a normal subframe without affecting the legacy UE. That is, the e-PDCCH can be configured using various methods according to e-PDCCH multiplexing scheme. To use the e-PDCCH, an e-PDCCH transmission scheme for an eNB and a blind search scheme for the legacy UE or e-PDCCH to receive DCI are needed. It is assumed that the e-PDCCH described in the specification uses one of the following three multiplexing schemes.

2.1 DCI Transmission Method

In legacy LTE system, since DCI for legacy UEs is transmitted through a legacy PDCCH, each legacy UE performs blind search only on the legacy PDCCH to receive DCI assigned thereto. However, the e-UE can receive DCI through the e-PDCCH in addition to the legacy PDCCH due to introduction of the e-PDCCH. In this case, it is necessary for an eNB to determine which one of the legacy PDCCH and the e-PDCCH is used to transmit DCI to the e-UE and the e-UE needs to determine a channel on which blind search will be performed.

Figure 24:
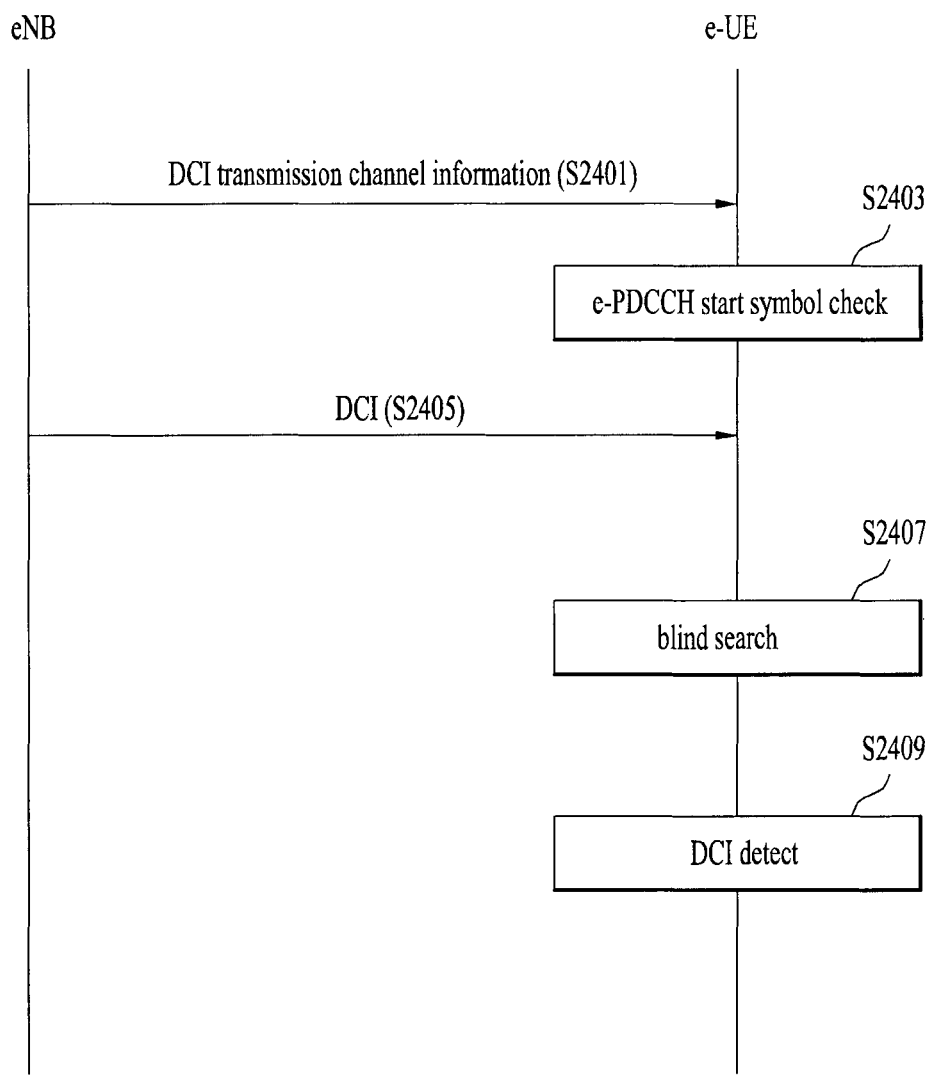
FIG. 24 illustrates a method of transmitting DCI to a UE according to an embodiment of the present invention.

FIG. 24 illustrates a method of transmitting DCI to a UE according to an embodiment of the present invention.

Referring to FIG. 24, when an eNB transmits DCI to an e-UE capable of receiving the DCI through an e-PDCCH, the eNB transmits DCI transmission channel information that indicates a downlink control channel through which the DCI will be transmitted to the e-UE (S2401). Here, the eNB may transmit the DCI through one of a legacy PDCCH and an e-PDCCH or transmit the DCI through both the legacy PDCCH and e-PDCCH.

The eNB may transmit the DCI transmission channel information using higher layer signaling or through the legacy PDCCH. The e-UE may be implicitly aware of the channel transmitting the DCI. When the e-UE implicitly recognizes the DCI transmission channel, step S3401 may be omitted. A method by which the e-UE checks the DCI transmission channel will be described in detail below.

When the e-UE confirms that the DCI is transmitted through the e-PDCCH or through both the legacy PDCCH and e-PDCCH using the DCI transmission channel information transmitted from the eNB or implicitly, the e-UE checks the start symbol of the e-PDCCH (S2403). Here, the e-UE can check the start symbol index of the e-PDCCH through a PCFICH, a PHICH or information transmitted through the legacy PDCCH. A method used for the e-UE to check the start symbol of the e-PDCCH will be described in detail below.

The eNB transmits the DCI to the e-UE through the corresponding downlink control channel (S2405). The e-UE performs blind search on the e-PDCCH region carrying the DCI according to the start symbol of the e-PDCCH, checked in step S2403 (S2407), to detect the DCI transmitted to the e-UE (S2409).

2.2 Method of Confirming DCI Transmission Channel 2.2.1. Reception of Channel Information Through UE-Specific Higher Layer Signaling The eNB can semi-statically configure which one of a legacy PDCCH and e-PDCCH is used to transmit DCI to an e-UE capable of receiving the e-PDCCH through UE-specific higher layer signaling. That is, the eNB can configure whether the DCI for the e-UE is transmitted through the legacy PDCCH or the e-PDCCH through UE-specific higher layer signaling. In this case, the e-UE may perform blind search on the legacy PDCCH only or on the e-PDCCH only according to higher layer signaling from the eNB.

Furthermore, the eNB can configure whether the DCI for the e-UE is transmitted through the legacy PDCCH, or through the e-PDCCH, or through both the legacy PDCCH and the e-PDCCH through UE-specific higher layer signaling. In this case, the e-UE may perform blind search on the legacy PDCCH only, on the e-PDCCH only, or on both the legacy PDCCH and the e-PDCCH according to higher layer signaling from the eNB.

2. 2. 2. Reception of Channel Information Through Cell-Specific Higher Layer Signaling The eNB can configure which one of the legacy PDCCH and the e-PDCCH is used to transmit the DCI for the e-UE through cell-specific higher layer signaling. DCI transmission channel configuration information through cell-specific higher layer signaling may be transmitted through a reserved field of a system information block (SIB) transmitted through a conventional broad control channel (BCCH), or transmitted through a new SIB defined for the e-UE. When DCI transmission channel information is transmitted through the reserved field of the SIB or through the new SIB for the e-UE, a legacy UE cannot recognize the DCI even if it receives the DCI. All e-UEs in a corresponding cell can receive their DCI by performing blind search on the legacy PDCCH only, the e-PDCCH only, or both the legacy PDCCH and the e-PDCCH according to cell-specific DCI transmission channel information.

2. 2. 3. e-PDCCH Enabled/Disabled Mode Configuration

The eNB may set an e-PDCCH enabled mode or an e-PDCCH disabled mode cell-specifically. When the cell-specific e-PDCCH enabled mode is set, the eNB transmits the legacy PDCCH and the e-PDCCH in all subframes. In this case, the e-UE receives DCI assigned thereto by performing blind search on the e-PDCCH. When the cell-specific e-PDCCH disabled mode is set, the eNB does not transmit the e-PDCCH and all UEs (legacy UE and e-UE) receive DCI allocated thereto by performing blind search on the legacy PDCCH.

In addition, the eNB may set a subframe-specific e-PDCCH enabled more or e-PDCCH disabled mode. In this case, the eNB configures an e-PDCCH configuration bitmap for every 10 ms frame, that is, every 10 subframes and transmits the e-PDCCH configuration bitmap. Specifically, the eNB can transmit the e-PDCCH configuration bitmap composed of 10 bits respectively corresponding to the first subframe (subframe #0) to the tenth subframe (subframe #9). The eNB sets the e-PDCCH enabled mode or e-PDCCH disabled mode for each subframe through a corresponding bitmap field and transmits DCI to the e-UE. The e-UE receives the DCI through blind search performed on the e-PDCCH in a subframe corresponding to the e-PDCCH enabled mode and receives the DCI through blind search carried out on the legacy PDCCH in a subframe corresponding to the e-PDCCH disabled mode. The cell-specific e-PDCCH mode or subframe-specific e-PDCCH mode is set through cell-specific higher layer signaling or UE-specific higher layer signaling.

2. 2. 4. Reception of Channel Information During Network Entry

The eNB can statically set whether the e-UE receives DCI through the e-PDCCH or the legacy PDCCH. To achieve this, UE-specific higher layer signaling that signals whether the e-UE receives the DCI using the e-PDCCH through a network entry procedure or the legacy PDCCH like legacy UEs can be defined. In this case, corresponding configuration information may be included in conventional signaling such as random access channel (RACH) response or RRC-connection response, or new RRC signaling may be defined. Furthermore, the eNB may cell-specifically signal corresponding configuration information through cell-specific higher layer signaling for the e-UE. The e-UE may be fixed such that it receives DCI through the e-PDCCH only, or fixed such that it performs blind search on both the legacy PDCCH and the e-PDCCH. Otherwise, it is possible to implicitly determine whether DCI is received through the legacy PDCCH or the e-PDCCH according to the cell radio network temporary identifier (C-RNTI) value of the e-UE. For example, when the least significant bit (LSB) of the C-RNTI value is 0, the e-UE receives the DCI through the legacy PDCCH. If the LSB of the C-RNTI value is 1, the e-UE receives the DCI through the e-PDCCH.

2. 2. 5. Confirmation Using PCFICH Value

It is possible to determine whether DCI is transmitted through the e-PDCCH according to the quantity of DCI that needs to be transmitted by the eNB through a corresponding subframe. That is, the eNB transmits DCI using a legacy PDCCH resource and may allocate the e-PDCCH only when the quantity of the transmitted DCI is less than the quantity of DCI destined to be transmitted through the legacy PDCCH resource. Specifically, the eNB adjusts the size of the legacy PDCCH depending on the quantity of DCI to be transmitted through a predetermined subframe, increases the legacy PDCCH size to up to 3 (4 when the system bandwidth is equal to or less than 10 RBs) corresponding to a maximum size when a large amount of DCI is present and transmits the DCI through the legacy PDCCH having the increased size. Conversely, when the legacy PDCCH having the maximum size is not sufficient to transmit the DCI, the eNB transmits the DCI through the e-PDCCH. The eNB transmits DCI of the legacy UE using CCEs of the legacy PDCCH preferentially and transmits DCI of the e-UE using remaining CCEs of the legacy PDCCH and an additionally allocated e-PDCCH.

The e-UE can check the size of the legacy PDCCH using a PCFICH received from the eNB. When the checked size of the legacy PDCCH is not the maximum size, the e-UE receives the DCI assigned thereto by performing blind search only on the legacy PDCCH without executing blind search on the e-PDCCH. When the size of the legacy PDCCH corresponds to the maximum size, the e-UE receives the DCI assigned thereto by performing blind search on the e-PDCCH as well as the legacy PDCCH. If the legacy PDCCH has a size greater than the maximum size, the eNB additionally signals whether the e-PDDCH is transmitted to the e-UE using a resource corresponding to specific at least one CCE in a fixed position of the legacy PDCCH (e.g. a resource having the highest or lowest logical CCE index).

2. 2. 6. Reception of Channel Information Through Specific CCE Resource of Legacy PDCCH The eNB may dynamically signal whether the e-PDCCH is transmitted to the e-UE using specific at least one CCE index in a fixed position of the legacy PDCCH for each subframe irrespective of the size of the legacy PDCCH. The e-UE can confirm whether the e-PDCCH is transmitted according to the at least one CCE index and performs blind search only on the legacy PDCCH when the e-PDCCH is not transmitted. When the e-PDCCH is transmitted, the e-UE may perform blind search only on the e-PDCCH, or additionally carry out blind search on the e-PDCCH upon blind search of the legacy PDCCH.

2. 3. Method of checking starting symbol of e-PDCCH 2. 3. 1. Configuration according to CFI of PCFICH As described above, an OFDM symbol index at which the e-PDCCH starts to be transmitted may change according to a CFI value transmitted through a PCFICH because the e-PDCCH is multiplexed with a PDSCH and transmitted through a PDSCH region. That is, e-PDCCH transmission can be started from the second symbol when the size of a PDCCH in the time domain according to the CFI value is 1 and can be respectively started from the third and fourth symbols when the size of the PDCCH in the time domain is 2 and 3. When the system bandwidth is equal to or less than 10 RBs, the size of the PDCCH in the time domain can be set to 4. In this case, e-PDCCH transmission can be started from the fifth symbol. Accordingly, the starting symbol of the e-PDCCH can be dynamically varied in a predetermined subframe according to a CFI value transmitted through a PCFICH of the subframe. The e-UE receives the PCFICH, determines the starting symbol value of the e-PDCCH according to the CFI value, and then performs blind search on the e-PDCCH from the starting symbol.

2. 3. 2. Fixing starting symbol The starting symbol of the e-PDCCH may be fixed irrespective of the CFI value transmitted through the PCFICH. Specifically, the starting symbol of the e-PDCCH may be fixed as a symbol following the symbol having the highest index in the legacy PDCCH when the legacy PDCCH has the maximum size. For example, the starting symbol of the e-PDCCH can be fixed as the fourth symbol (fifth symbol when the system bandwidth is equal to or less than 10 RBs). In this case, the e-UE, which receives DCI thereof through the e-PDCCH, can perform blind search on the e-PDCCH from the fourth or fifth symbol irrespective of the CFI value of the PCFICH. In a cell in which the e-PDCCH is transmitted, DCI for UEs (legacy UE and e-UE) in the cell is transmitted through the legacy PDCCH and the e-PDCCH, and thus minimal load may be applied to the legacy PDCCH may be small. Particularly, when a channel through which DCI for the legacy UE is transmitted and a channel through which DCI for the e-UE is transmitted are separated from each other by setting UE-specific (or user-specific) DCI for the e-UE such that it can be transmitted only through the e-PDCCH, the DCI for the legacy UE is transmitted using the legacy PDCCH and the DCI for the e-UE is transmitted using the e-PDCCH. Accordingly, DCI transmission load is distributed to two channels.

Furthermore, since a case in which the legacy PDCCH having the maximum size is used is barely generated, it is possible to limit the size of the legacy PDCCH using a scheduler and to fix the starting symbol of the e-PDCCH as a preceding symbol. For example, the size of the legacy PDCCH can be fixed to equal to or less than 2 and the starting symbol of the e-PDCCH can be fixed as the third symbol. Otherwise, the size of the legacy PDCCH can be fixed to 1 and the starting symbol of the e-PDCCH can be fixed as the second symbol.

2. 3. 3. Configuration According to PHICH Duration

The e-UE may implicitly determine the starting symbol of the e-PDCCH according to a PHICH duration value transmitted through a PBCH. For example, the starting symbol of the e-PDCCH can be determined as the second symbol when the PHICH duration is 1 and determined as the third symbol when the PHICH duration is 2.

2. 3. 4. Configuration Through e-PCFICH

An e-PCFICH that signals information about e-PDCCH allocation can be defined using a resource corresponding to at least one CCE in a fixed position of the legacy PDCCH. For example, the resource having the first or last logical CCE index can be used to transmit the e-PCFICH. In this case, the eNB can signal the starting symbol, transmission mode and frequency resource information, etc. of the e-PDCCH to a UE through the e-PCFICH. The e-PCFICH may be transmitted using one CCE or two or more CCEs on the basis of the quantity of information transmitted to the UE.

3. Apparatus for Implementing the Present Invention

Figure 25:
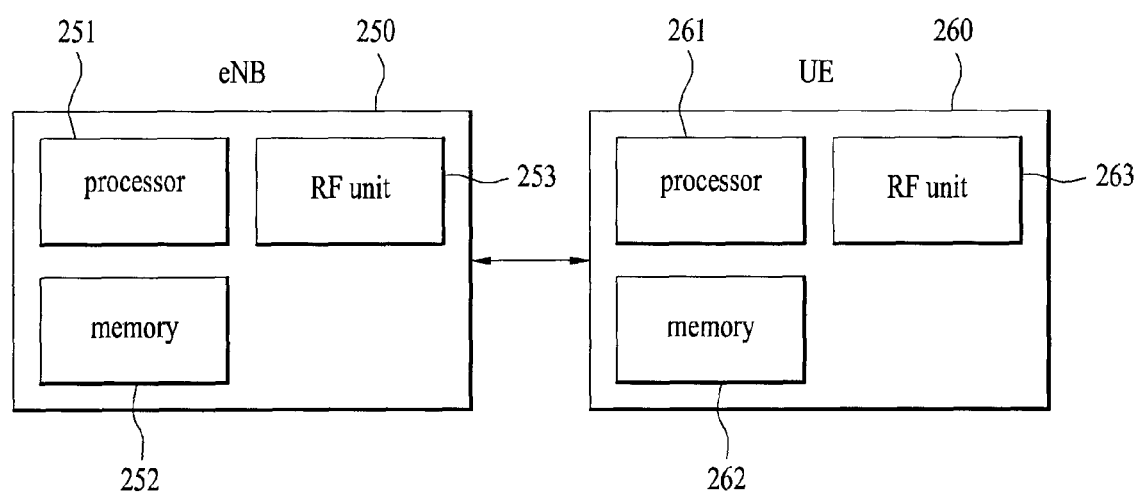
FIG. 25 is a block diagram of a wireless communication apparatus according to an embodiment of the present invention.

FIG. 25 is a block diagram of a wireless communication apparatus according to an embodiment of the present invention.

Referring to FIG. 25, a wireless communication system includes a eNB 250 and a plurality of UEs 260 belonging to the eNB 250. The UEs 260 include both the aforementioned legacy-UE and e-UE.

The eNB 250 includes a processor 251, a memory 252, a radio frequency (RF) unit 253. The processor 251 may be configured to implement the functions, procedures and/or methods proposed by the present invention. Layers of a wireless interface protocol may be implemented by the processor 251. The memory 252 is connected to the processor 251 and stores various types of information for operating the processor 251. The RF unit 253 is connected to the processor 251, transmits and/or receives an RF signal.

The UE 260 includes a processor 261, a memory 262, and an RF unit 263. The processor 261 may be configured to implement the functions, procedures and/or methods proposed by the present invention. Layers of a wireless interface protocol may be implemented by the processor 251. The memory 262 is connected to the processor 261 and stores information related to operations of the processor 262. The RF unit 263 is connected to the processor 261, transmits and/or receives an RF signal.

The memories 252 and 262 may be located inside or outside the processors 251 and 261 and may be connected to the processors 251 and 261 through various well-known means. The eNB 250 and/or UE 260 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

A method of transmitting/receiving data in a wireless access system is applicable to various wireless access systems in addition to the 3GPP LTE system.

The invention claimed is:

1. A method of receiving downlink control information (DCI) by a user equipment (UE) via an enhanced physical downlink control channel (EPDCCH) multiplexed with a physical downlink shared channel (PDSCH) in a wireless access system supporting the EPDCCH , the method comprising:
   receiving, from an eNB, an EPDCCH configuration indicating whether the EPDCCH for the UE is configured;
   if the EPDCCH configuration contains an information indicating an EPDCCH starting symbol, receiving the EPDCCH from a starting OFDM (Orthogonal Frequency Division Multiplexing) symbol for the EPDCCH according to the information indicating EPDCCH starting symbol; and
   if the EPDCCH configuration does not contain the information indicating the EPDCCH starting symbol, receiving the EPDCCH from a starting OFDM symbol for the EPDCCH which is determined by using a control format indicator (CFI) value based on a downlink bandwidth configuration.

2. The method according to claim 1, wherein an index of the starting OFDM symbol for the EPDCCH is set as a value corresponding to the CFI value when the downlink bandwidth configuration is greater than 10 resource blocks.

3. The method according to claim 1, wherein the EPDCCH configuration is transmitted from the eNB to the UE by using higher layer signaling.

4. The method according to claim 1, the EPDCCH configuration further indicates a plurality of subframes for the EPDCCH by using a bitmap.

5. The method according to claim 1, wherein the CFI value is received from the eNB via a PCFICH (Physical Control Format Indicator CHannel).

6. The method according to claim 1, wherein the index of the starting OFDM symbol for the EPDCCH is the same as an index of a starting OFDM symbol for the PDSCH.

7. A user equipment (UE) for receiving DCI via an enhanced physical downlink control channel (EPDCCH) multiplexed with a physical downlink shared channel (PDSCH) in a wireless access system supporting the EPDCCH, the UE comprising:
   a radio frequency (RF) unit configured to transmit/receive RF signals; and
   a processor operatively connected to the RF unit,
   wherein the processor is configured to
      receive, from an eNB, an EPDCCH configuration indicating whether the EPDCCH for the UE is configured,
      receive the EPDCCH from a starting OFDM (Orthogonal Frequency Division Multiplexing) symbol for the EPDCCH according to information indicating EPDCCH starting symbol, if the EPDCCH configuration contains the information indicating an EPDCCH starting symbol, and
      receive the EPDCCH from a starting OFDM symbol for the EPDCCH which is determined by using a control format indicator (CFI) value based on a downlink bandwidth configuration, if the EPDCCH configuration does not contain the information indicating the EPDCCH starting symbol.

8. The UE according to claim 7, wherein an index of the starting OFDM symbol for the EPDCCH is set as a value corresponding to the CFI value when the downlink bandwidth configuration is greater than 10 resource blocks.

9. The UE according to claim 7, wherein the EPDCCH configuration is transmitted by using higher layer signaling.

10. The UE according to claim 7, wherein the EPDCCH configuration further indicates a plurality of subframes for the EPDCCH by using a bitmap.

11. The UE according to claim 7, wherein the CFI value is received from the eNB via a PCFICH (Physical Physical Control Format Indicator CHannel).

12. The UE according to claim 7, wherein the index of the starting OFDM symbol for the EPDCCH is the same as an index of a starting OFDM symbol for the PDSCH.

* * * * *